United States Patent [19]
Musick

[11] 4,318,778
[45] Mar. 9, 1982

[54] METHOD AND APPARATUS FOR CONTROLLING A NUCLEAR REACTOR

[75] Inventor: Charles R. Musick, Vernon, Conn.

[73] Assignee: Combustion Engineering, Inc., Windsor, Conn.

[21] Appl. No.: 362,698

[22] Filed: May 22, 1973

[51] Int. Cl.³ ............................................. G21C 7/36
[52] U.S. Cl. ................................................. 376/216
[58] Field of Search ........................... 444/935, 936.5; 340/172.5; 235/151.21; 176/19 R, 19 J, 19 EC, 24, 20 R, 20 SS, 21, 22, 25

[56] References Cited

U.S. PATENT DOCUMENTS

| | | | |
|---|---|---|---|
| 3,065,162 | 11/1962 | Hub | 176/20 R |
| 3,114,263 | 12/1963 | McCann | 176/19 J |
| 3,202,804 | 8/1965 | Schlein | 176/24 |
| 3,211,622 | 10/1965 | Brown | 176/20 R |
| 3,356,577 | 12/1967 | Fishman | 176/24 |
| 3,423,285 | 1/1969 | Curry et al. | 176/24 |
| 3,424,653 | 1/1969 | Cohn | 176/22 |
| 3,565,760 | 2/1971 | Parkos et al. | 176/24 |
| 3,625,815 | 12/1971 | Fishman | 176/24 |
| 3,656,074 | 4/1972 | Beilacquo et al. | 176/19 R |

FOREIGN PATENT DOCUMENTS 1149062  4/1969  United Kingdom ........... 176/19 EL

OTHER PUBLICATIONS

John H. Perry, Chemical Engineer's Handbook, 1963, pp. 22-63 to 22-74.
Yevick et al., Fast Reactor Technology: Plant Design, 1966, pp. 598-599.
Hewlett Packard, Microprograming Guide, Feb. 1972, pp. 1.1-1.5.
Earl W. Swokowski, Calculus with Analytic Geometry, 1979, pp. XV-XVI, 188-189, 201-203, 207, 245.
L. S. Tong, "Prediction of Departure from Nucleate Boiling for An Axially Non-Uiform Heat Flux Distribution," Journal of Nuclear Energy, 1967, vol. 21, pp. 241-248.

Primary Examiner—Stephen C. Bentley
Attorney, Agent, or Firm—Lombro James Ristas

[57] ABSTRACT

A control system and method for a nuclear steam supply system for continuously predicting the pending violation of one of the system's design limits. The prediction is made far enough into the future to allow corrective or protective action to be implemented in a timely manner in order to avoid violation of a design limit even on the occurrence of a worst case accident, or, restated, the occurrence of an accident which causes a most rapid approach to the design limit. Various parameters of the nuclear steam supply system are monitored and fed to a calculating mechanism. Samples of these parameters are periodically taken for the periodic detailed calculation of an index representative of the proximity of violation of the appropriate design limit. Continuous readings of these same parameters are taken for the purpose of making continuous updates of the last calculated index. Also, on a continuous basis, continuous readings of the rate of change (slope) of selected parameters are taken and calculations made on the basis of the rate of change of those parameters to obtain a prediction of the parameter a certain time (T) into the future. Modifications to the index are continuously made to the last calculated value of the index to give a prediction of the index (T) seconds into the future. When this predicted index violates a preselected set point, indicating the impending actual violation of a design limit, a signal may be generated to institute protective action which can be accomplished in the T seconds over which the prediction was made.

44 Claims, 16 Drawing Figures

EQUALS

EQUIVALENT TO

EQUALS

METHOD AND APPARATUS FOR CONTROLLING A NUCLEAR REACTOR

The following allowed and issued patents are herein incorporated by reference: U.S. Pat. No. 3,752,735 issued on Aug. 14, 1973 entitled "Instrumentation for Nuclear Reactor" invented by Charles R. Musick and Richard P. Remshaw. U.S. Pat. No. 3,356,577 issued to Ygal Fishman on Dec. 5, 1967 entitled "Apparatus for Determining the Instantaneous Output of a Nuclear Reactor".

BACKGROUND OF THE INVENTION

1. Field of the Invention

The present invention relates to safety systems for nuclear reactors. More specifically, this invention is directed to the prediction of internal reactor conditions commensurate with maintaining the integrity of the fuel element cladding. Accordingly, the general object of the present invention is to provide novel and improved apparatus and methods of such character.

The performance of a nuclear reactor, like that of many other energy conversion devices, is limited by the temperatures which component materials will tolerate without failure. In the case of a reactor with a core comprising an assemblage of fuel assemblies which in turn consist of an array of fuel rods or pins, the upper limit of temperature is imposed by the fuel rod or fuel pin cladding material employed. In order to adequately protect the reactor core against excessive temperatures, it is necessary to examine the temperature of the "hottest" fuel pin or the "hottest" coolant channel between adjacent fuel pins of the core, since damage will first occur in the "hottest" fuel pin. Thus the "hottest" pin or channel becomes the limiting pin or channel for the reactor core.

As is well known, heat is generated in a reactor by the fission process in the fuel material. The fission process, however, produces not only heat but radioactive isotopes which are potentially harmful and which must be prevented from escaping to the environment. To this end, the fuel is clad with a material which retains the fission products. In order to prevent clad overheating and in the interest of precluding release of the fission products which would occur on clad damage or failure, a coolant is circulated through the reactor core. Heat transferred to the circulating coolant from the fuel elements is extracted therefrom in the form of usable energy downstream of the reactor core in a steam generator. Thus, for example, in a pressurized water reactor system, the water flowing through the core is kept under pressure and is pumped to the tube side of a steam generator where its heat is transferred to water on the shell side of the generator. The water on the shell side is under lower pressure and thus the thermal energy transfer causes the secondary water to boil and the steam so generated is employed to drive the turbine.

To summarize, in the design and operation of a nuclear reactor, the basic objective of removing heat from the fuel must be obtained without allowing the temperature of the fuel cladding of the limiting fuel pin to rise to such a degree that the clad will fail.

As the coolant circulates through the reactor core, heat will be transferred thereto either through subcooled convection, often referred to as film conduction, or through nucleate boiling. Nucleate boiling occurs at higher levels of heat flux and is the preferred mode of operation since it permits more energy to be transferred to the coolant thereby permitting the reactor to be operated at higher levels of efficiency. Nucleate boiling is characterized by the formation of steam bubbles at nucleation sites on the heat transfer surfaces. These bubbles break away from the surface and are carried into the main coolant stream. If the bulk coolant enthalpy is below saturation, the steam bubbles collapse with no net vapor formation in the channel. This phenomenon is called subcooled boiling or local boiling. If the bulk fluid enthalpy is at or above the enthalpy of saturated liquid, the steam bubbles do not collapse and the coolant is said to be in bulk boiling.

If the heat flux is increased to a sufficiently high value, the bubbles formed on the heat transfer surface during nucleate boiling are formed at such a high rate that they cannot be carried away as rapidly as they are formed. The bubbles then tend to coalesce on the heat transfer surface and form a vapor blanket or film. This film imposes a high resistance to heat transfer and the temperature drop across the film can become very large even though there is no further increase in heat flux. The transition from nucleate boiling to film boiling is called "departure from nucleate boiling", hereinafter referred to as DNB, and the value of the heat flux at which it occurs is called the "DNB heat flux" in a pressurized water reactor or the "critical heat flux" in a boiling water reactor. A factor also to be considered is the creation of flow instabilities resulting from excessive coolant void fractions.

Another condition which requires protective action is the occurrence of a high local power density in one of the fuel pins. An excessive local power density initiates centerline fuel melting which may lead to a violation of the fuel clad integrity. In addition, a condition of excessive local power density is unacceptable in the event of a Loss of Coolant Accident (LOCA) since excessive local power densities would cause the clad temperature to exceed allowable limits if the coolant were lost. As the result of analyses of Loss of Coolant Accidents, values are established by the reactor designers for the maximum allowable local power densities at the inception of a LOCA such that the criteria for acceptable consequences are met. The maximum local power density or local power limit is generally specified as a kilowatt per foot (KW/ft) limit.

A third condition which acts as an operating limit is the licensed power at which the particular reactor is permitted to run. All three of these "limiting conditions for operation" must be monitored in order to make reactor operation safe. Since clad damage is likely to occur because of a decrease in heat transfer coefficient and the accompanying higher clad temperatures which may result when DNB occurs, or because of an excessive local power density, the onset of these conditions must be sensed or predicted and corrective action in the form of a reduction in fission rate promptly instituted. Restated, in reactor operation DNB must be prevented since the concurrent reduction in clad strength as temperature increases can lead to a clad failure because of the external coolant pressure or because of the internal fission gas pressures in the fuel rod. One way of monitoring DNB in the reactor is to generate an index or a correlation which indicates the reactor condition with respect to the probability of the occurrence of DNB. (See L. S. Tong, "Prediction of DNB for an Axially Non-uniform Heat Flux Distribution", *Journal of Nuclear Energy*, 21:241, 1967). This correlation is alternatively called Departure from Nucleate Boiling Ratio (DNBR) or Critical Heat Flux Ratio and is defined as the ratio of the heat flux necessary to achieve DNB at specific local coolant conditions to the actual local heat flux. The two correlations stem from slightly differing statistical derivations so that the critical values of DNBR and critical heat flux ratio are defined to be 1.3 and 1 respectively. These are the statistically established limiting values above which DNB has a very small probability of occurring. In the following discussion and claims, it should be understood that DNBR will be used, for the sake of simplicity, as describing both of the correlations. Thus, DNBR for the purposes of this discussion and description, shall mean both the Tong W-3 correlation for Departure from Nucleate Boiling Ratio and the Critical Heat Flux Ratio Correlation. Additionally, an excessive KW/ft. in the limiting or "hottest" fuel pin in the core must be avoided in order to maintain the integrity of the cladding or to prevent violation of the limiting conditions for operation established by a Loss of Coolant Accident analysis.

It is known that DNB occurs as a function of the reactor operating parameters of heat flux or power distribution, primary coolant mass flow rate, primary coolant pressure and primary coolant temperature. In order to prevent an excessive KW/ft. or DNB (also called "burn-out") or "boiling crisis", reactor protective systems must be designed to insure that reactor operation is rapidly curtailed, a condition known in the art as "reactor trip" or "reactor scram", before the combination of conditions commensurate with DNB or excessive local power density can exist. Departure from nucleate boiling and DNB Ratio may be expressed for one fuel pin or channel as:

(1) $DNBR = f(\phi, T_c, P, \dot{m}, F_r, F_z(z), T_r)$ and the LOCA or centerline fuel melt limit may be expressed as:

(2) $KW/FT \text{ limit} = f(\phi, F_r, F_z(z))$ where:
$\phi$ = Core Power in Percent of Fuel Power
$T_c$ = Coolant Inlet Temperature
$P$ = Coolant Pressure
$\dot{m}$ = Coolant Mass Flow Rate
$F_r$ = Integral Radial Power Peaking Factor
$F_z(z)$ = Axial Power Distribution in the Pin which has the Integral Radial Power Peaking Factor
$T_r$ = Azimuthal tilt magnitude which is a measure of side to side xenon oscillation Core power in percent of full power may be determined in a manner similar to that disclosed in the referenced U.S. Pat. No. 3,752,735 entitled "Instrumentation for Nuclear Reactor". Integral radial power peaking factor is defined as the maximum ratio of power generated in any fuel pin in the core to the average fuel pin power.

Axial power distribution is defined for each fuel pin as a curve of local pin power density versus axial distance up the pin divided by the total power generated in the pin. See the "Description of the Preferred Embodiment" and the "Appendix to the Description of the Preferred Embodiment" for a more detailed discussion.

The other parameters of coolant inlet temperature, reactor coolant system pressure and coolant mass flow rate may be determined in conventional manners. For example, see co-pending U.S. Pat. No. 3,791,922 entitled "Thermal Margin Protection System" filed Nov. 23, 1970, for methods for obtaining coolant inlet temperature. An accurate measure of coolant mass flow rate may be obtained from the speed of the coolant pumps. A very accurate and low noise signal may be obtained from the shaft associated with the coolant pumps to determine the pump speed. Each shaft is provided with a large number of teeth or notches around its periphery. Means such as a transducer are provided for detecting the passage of the teeth past a fixed position. The output signal from the transducer consists of an extremely regular pulsed signal with a frequency directly related to the pump speed which is, in turn, directly related to the coolant flow.

In the first equation for DNBR, it is important to recognize that a value of DNBR above 1.3 results in a high probability that acceptable thermal values would exist in the core such that a departure from nucleate boiling would not occur. However, when the DNBR falls below this value, the probability of DNB and clad failure would be expected to increase to unacceptable values. Similarly in equation (2) the KW/ft. limit on the left hand side of the equation is a fixed number determined either by LOCA or the local power density that causes the degree of centerline fuel melting which is adopted as the fuel design limit by the reactor designers. For purposes of generalization and for the purposes of this disclosure, both the DNBR and KW/ft. can be thought of as indices which are indicative of the proximity of operation to the appropriate design limit. The same or similar treatment can be made for any design limit which is amenable to a mathematical representation. Therefore, this invention is applicable to any design limit and any index which can be generated mathematically from parameters of the system.

2. Description of the Prior Art

Heretofore, the prior art has attempted core protection through means and methods that have sacrificed plant capacity and availability. Various schemes with different degrees of sophistication were implemented, none of which enabled the utilization of the plant's full potential. The least sophisticated system consisted of the establishment of a series of independent limits for each of the parameters upon which the design limit in question depended. By so doing, this prior art method could not account for the functional interdependence of all of the variables. Thus, the situation could arise in which one parameter deviated from its optimum value, without causing an approach to the design limit since the other parameters on which the design limit depended might have compensated for the one bad parametric value. Nevertheless, under this prior art system, a reactor trip would have been initiated if the deviation of the one parameter caused the parametric value to exceed the independently determined envelope for that parameter.

A second more sophisticated prior art scheme attempted to utilize, to a greater degree, the functional dependence of the design limit index on the plurality of parameters. However, even in this more sophisticated scheme, certain approximations and assumptions were made to render the functional dependence simple enough so that it could be easily reproduced in analogue circuitry. A typical type of assumption which had to be made was to assume that as many as two or three parameters were either constants held at their design values or were variables which varied only within their allowed envelopes. This second more sophisticated prior art scheme increased the plant availability and capability but, nonetheless, could not approach the optimum operating conditions since the calculations were limited by the degree of refinement which was allowed by the analogue circuitry.

Another common failing of the prior art systems was that there was often no recognition of the fact that it is not sufficient merely to avoid design limit violation on steady state operation, but design limit violation must also be avoided on the occurrence of accidents which cause rapid approach to the design limit. Thus, prior art systems often permitted operation close to the design limit on a steady state basis, without provision for avoiding design limit violation on the occurrence of an anticipated operational occurrence (which is defined as a condition of normal operation which is expected to occur one or more times during the life of a nuclear power plant). The trend toward very large and high power nuclear reactors results in core dynamics not previously considered a problem. Axial and azimuthal xenon oscillations, as well as xenon redistribution after power changes, must be taken into consideration. With reactors operating close to thermal—hydraulic limits, these transient conditions must be coped with relatively quickly. Because of the complexity of determining the core power distribution, an on-line computer is necessary to aid the operator in determining the control actions necessary to maintain the reactor within operational limits. Only by use of plant computers can surveillance and assimilation of the large quantity of plant parameters be handled.

Demands for greater reactor availability and increased emphasis placed on safety requirements designed to protect the reactor's core and the integrity of fuel rod cladding cogently point out the need for a flexible and rapid system which not only prevents the core from exceeding its safety limits but also allows operation of the reactor close to those limits in order to maximize reactor efficiency and availability. Such a protection system must consist of two components: One system for sensing reactor conditions and tripping the reactor when a safety limit violation is imminent, and a second system for calculating the appropriate operating limits which would insure that the protection system has sufficient time to safely trip the reactor while at the same time allowing maximum use of the reactor. In the following discussion, the first system will be called the "core protection calculator" and the second system will be called the "Core Operating Limit Supervisory System" (COLSS). The teaching which is required for an understanding of the mathematical derivations of some of the inputs to these two systems is to be found in the "Appendix to the Description of the Preferred Embodiment".

SUMMARY OF THE INVENTION

The instant invention involves a protection apparatus and method whose function it is to ensure the safe operation of a nuclear reactor. In order to achieve safe operation of a nuclear reactor, the reactor and its collateral systems must be operated so as to avoid the violation of certain safety design limits. This involves not only avoiding the actual violation of these design limits when operating on a steady-state basis but also operating the system in such a manner as to avoid design limit violation on the occurrence of an incident of the type which is expected to occur at least once in the life of the system. Many of these incidents occur very rapidly, for example, simultaneous loss of power to all four coolant pumps, and cause undesirable rapid approaches to the safety design limits. It is, therefore, of utmost importance to provide the reactor system with protection means that insures that serious and rapid approaches to the various safety design limits, which would bring about a violation of the design limits, are detected early enough to allow the initiation and completion of corrective or preventive action before the design limits are violated. If the reactor and its collateral systems are operated without this ability to detect the impending violation of a design limit, then it can be expected that a critical design limit, such as those calculated to maintain fuel cladding integrity, will be violated on the occurrence of one of these accidents.

The invention herein disclosed is a method and apparatus for calculating and predicting the impending violation of a design limit if no corrective action is taken. Various mathematical indices can be devised, such as the departure from nucleate boiling ratio (DNBR), which indicate the proximity of the limiting conditions for the design limit in question, i.e., the occurrence of departure from nucleate boiling (DNB) and fuel clad overheating. A critical value of the index can be defined to be that value at which design limit violation occurs. To facilitate an understanding of this invention, the following discussion will be described in terms of DNBR as the index of interest and fuel clad integrity as the design limit which the DNBR index describes. However, it should be understood that the invention is not so limited since the apparatus and methods described for predicting DNBR are applicable to any index which can be mathematically generated from various measurable or calculable reactor parameters.

This invention involves the monitoring of the appropriate reactor parameters and continuously making calculations of DNBR from those parameters. The calculation involved is a lengthy one and must be made periodically on the order of every two seconds, so if a responsive DNBR is to be obtained, it is necessary to provide a nearly instantaneous update to the last complete calculation of DNBR. This is done by continuously comparing the value of each one of the parameters last used in the last complete calculation of DNBR to the value of that parameter that exists at the present time. This comparision produces a change in that individual parameter. Each increment of change of each particular parameter is multiplied by a value which is a conservative estimate of change of DNBR which can be attributed to the change in that parameter. A like procedure is carried out for all parameters necessary to calculate DNBR to obtain a multiplicity of changes in DNBR resulting from the changes in each parameter. These changes in DNBR are then added to obtain a net change in DNBR that has occurred since the beginning of the calculation due to the changes in all of the parameters needed to calculate the DNBR. The net change in DNBR is then added to the last completely calculated value of DNBR, thereby generating an updated DNBR which is continuously responsive to the effects of the instantaneous changes of each parameter. Coolant flow rate, neutron flux power and coolant pressure are examples of parameters effected by a system incident and which bring about rapid changes in DNBR.

It is not sufficient merely to obtain an updated value of DNBR at each instant in order to avoid violation of DNBR, since the occurrence of an incident may cause limit violation even if operating conditions were acceptable prior to the accident. In other words, the incident may bring about such rapid changes of operating conditions that there is not sufficient time to recognize that an incident has occurred and still avoid a limit violation. Therefore, the protection system must have the capability of monitoring the appropriate parameters and of predicting what the DNBR index value will be a certain period of time into the future. The specific period of time is that period of time that is required to insititute and complete effective protective action on the reactor after the incident has occurred and before the design limit is violated. This period of time is essentially the reaction time of the protective equipment and in most cases will be of constant magnitude dependent upon the characteristics of the equipment involved in the calculation and control steps.

This invention, therefore, further includes the monitoring of various parameters and the prediction of a future DNBR on the basis of the behavior of the parameters monitored. This is done by continuously detecting the rate of change of the parameter (i.e., the slope on a plot of parameter magnitude vs. time) and multiplying that rate of change of parameter value by the preselected time period (T). This gives a value of the amount that the parameter will have changed (assuming that the rate of change of the parameter remains the same) after the time period (T). Next, this value of change in parameter is multiplied by a value which converts the change in parameter into a value indicative of change of DNBR due to the change of that parameter. The value by which the change of the parameter is multiplied is the partial derivative of DNBR with respect to the parameter in question. This change in DNBR, which is the projected change in DNBR over the time period (T) expected from the rate of change of the parameter in question, is then added to the continuously updated value of DNBR calculated above to give a projection of DNBR over the time period T. By knowing this projected DNBR, a comparison can be made to the critical value of the DNBR index. When the projected index passes through the critical value of index, protection measures can be initiated with the assurance that a time period of duration T is available to correct the conditions and to avoid the design limit violation.

By following the above outlined method the situation may arise, due to the sensitive dependence of the index on one of the parameters and due to the possible inaccuracies in the calculation of the updated index, in which the originally monitored parameter undergoes variations that would lead the protective system into falsely believing that a design limit will be violated. Thus, it is desirable to provide a desensitizing means without sacrificing any of the protective system's capability to detect an accident and predict the impending violation of a design limit. Such a means and method are provided by the invention and will be hereinafter described.

The desensitizing method depends on the fact that the nuclear reactor should be operated in accordance with an index (e.g., DNBR) which is separated from the critical value of the index by some margin. If this were not the case, i.e., if there were no restrictions placed on the approach of the operating index to the critical value of the index, then the protection system would be unable to avoid violation of the critical value of the index on the occurrence of an accident, regardless of its prediction abilities. Therefore, a certain minimum operating margin must be maintained. The desensitizing method takes credit for the maintenance of this margin by selecting the higher of: the updated index calculated from the actual parameters; and an updated index whose calculation derives from a false or limit index which assures the maintenance of an operating margin. After making this selection, the predicted change of the index obtained as described above is added to the higher value to get the predicted index T-seconds into the future. The method for obtaining an updated value of the index based on the index incorporating some operating margin is as follows.

The long term average value of the parameter in question is obtained by integrating the parameter with respect to time, and dividing by the time period over which the integration was taken. Next, the instantaneous value of the parameter is compared to the long term average value to obtain the deviation of the parameter from the long term average value. The value thus obtained is then constrained to be equal to or less limiting on DNBR than the instantaneous value of the parameter in question. This step generates a constrained electrical signal which is never permitted to represent a condition which would be indicative of an index which is less favorable than the index which would be derived from the instantaneous value of the parameter. This deviation or change in parameter is then converted into a value which is equivalent to the change in index due to the change in the parameter by multiplying the deviation by the partial derivative of the index with respect to the parameter in question. The change in index thus obtained is then added to the value of index which incorporates the margin discussed above, the results being an instantaneously updated value of the index containing said margin. This value is then compared to the other continuously updated value of index computed from the parameters as described above, and the higher value of the two selected for subsequent use.

The subsequent use includes the addition to the selected higher value of the predicted change in the index due to the projected change in the parameter over the projected time T also described above. The net result is the derivation of a projection of index (DNBR) which is calculated either from the computed value of index or from the value of index containing the operating margin, whichever is higher, thereby taking advantage of the operating margin and thereby desensitizing the projection of the index.

DESCRIPTION OF THE DRAWINGS

FIG. 9 is included as a visual aid for a better understanding of the mathematical definitions and derivations found in the "Appendix to the Description of the Preferred Embodiment".

FIG. 11a is a diagrammatic representation of a core which has been sliced into slices of thickness $d_z$, indicating the positions of the hottest pin in each slice.

FIG. 11b is a diagrammatic representation of the pseudo hottest or limiting pin obtained by stacking all of hottest pins for each slice into a single psuedo pin extending through all of the slices.

DESCRIPTION OF THE PREFERRED EMBODIMENT

In the art of reactor control the objectives to be achieved are the maximization of plant capacity and availability without violating the specified acceptable fuel design limits as a result of normal operation and anticipated operational occurrences. These limits are defined to provide a high degree of assurance that the fuel cladding integrity is maintained.

Each of the design limits can be formulated in a mathematical description which gives an indication of the proximity to the violation of the design limit. These indices are mathematically dependent upon the various reactor parameters. One such index is the Departure from Nucleate Boiling Ratio (DNBR) which is indicative of the probability of occurrence of Departure from Nucleate Boiling (DNB), For each index a critical value of index may be determined which indicates when the probability is acceptably low that a reactor design limit is violated. In the case of DNBR the critical value has been determined to be 1.3. The DNBR index is functionally dependent upon the reactor parameters of coolant mass flow rate, coolant pressure, coolant inlet temperature, reactor power and reactor power distribution. The reactor must be operated in such a way that the critical values of each index are not violated in either of two cases: (1) steady state operation and (2) in the event of the occurrence of an anticipated operational occurrence which affects the values of the parameters on which the index is dependent.

For the purposes of this description of the preferred embodiment, discussion will focus on the index called DNBR and the dependence of DNBR on the reactor parameter of reactor coolant mass flow rate. This choice has been made because the one most rapid anticipated operational occurrence that can occur in the operation of a pressurized water reactor is the simultaneous loss of power to all reactor coolant pumps. Other anticipated operational occurrences can occur that affect either the coolant mass flow rate or the other parameters but these other incidents result in a less rapid change in the DNBR. Therefore, the approach to the critical value of DNBR is less rapid and more time is available for initiation of protective measures. If a reactor protection system is devised to adequately handle the most rapid anticipated operational occurrence, then, by definition, its dynamic performance is adequate to accommodate the slower anticipated operational occurrences.

Figure 2:
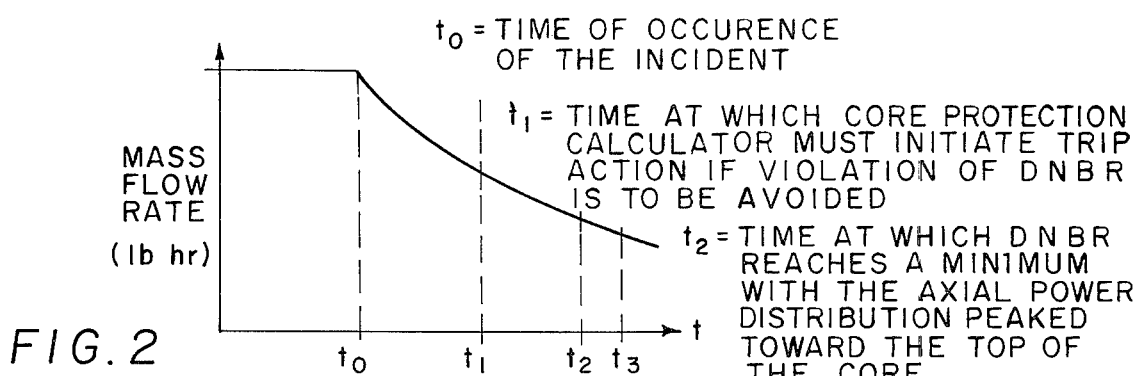
FIG. 2 is a plot of the decay in the primary coolant mass flow rate on the occurrence of an accident which interrupts electrical power to all of the primary coolant pumps.
Figure 3:
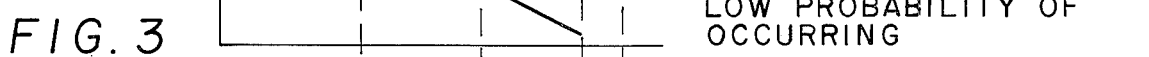
FIG. 3 is a plot of the corresponding decay in the DNBR index due to the decay in the primary coolant mass flow rate on the occurrence of an accident which interrupts electrical power to all of the primary coolant pumps.

For a better understanding of the dependence of DNBR on coolant flow rate, refer to FIGS. 2 and 3. FIG. 2 is a plot of the decay in the reactor coolant mass flow rate on the occurrence of an incident which interrupts electrical power to all of the reactor coolant pumps. Examination of the plot of FIG. 2 shows that the incident occurs at time $t_0$ and the mass flow rate shows an exponential decay from the steady state condition existing before the occurrence of the incident. FIG. 3 shows the rapid fall in DNBR for two situations. The first situation is one in which the steady state operation before the accident was such that the initial value of DNBR was slightly above the critical value of 1.3. In this case the DNBR falls almost immediately below the critical value, indicating that the probability of damage to the fuel cladding is higher than desired. In the second situation, the operation of the reactor prior to the incident resulted in a steady state DNBR of approximately 1.8. On the occurrence of the incident, the value of DNBR drops rapidly toward the critical value of 1.3. Unlike the first situation, in which the critical value was almost immediately violated, the second situation will bring about a violation of the critical value of DNBR only after a certain time period. It can be seen from these two described situations that operation of the reactor with an initial margin to the critical value of DNBR is preferable since a period of time is available for the sensing and calculating of the occurrence of the accident and the initiation and completion of the corrective measures (reactor scram).

Figure 4:
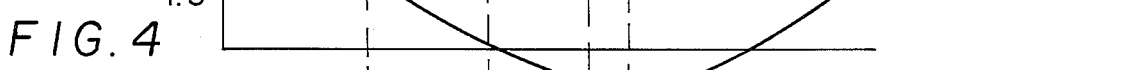
FIG. 4 is a plot of the desirable behavior of the DNBR index achieved through the successful initiation and completion of corrective action on the occurrence of an accident which interrupts electrical power to all of the primary coolant pumps.

FIG. 4 shows the dependence of DNBR in the two situations described above including the effect of the actions of a protection system which detects the fall of coolant flow rate and which initiates a reactor scram. It can be seen in the second situation which starts from a DNBR value of 1.8, that due to the time delay between the time of occurrence of the incident and the time at which the DNBR violates the critical value, the protection apparatus has sufficient time to terminate the decrease in DNBR before the critical value of DNBR is violated. Such is not the case for the first situation and the critical value of DNBR is violated regardless of the initiation of protective action.

Figure 5:
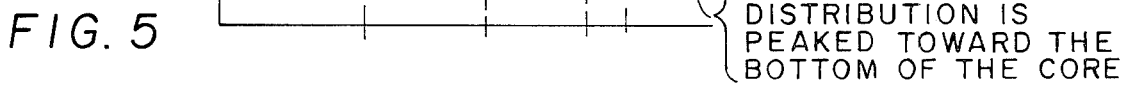
FIG. 5 is a plot of the behavior of the decay of DNBR index on the occurrence of a loss of coolant flow accident for two different axial power shapes.

A further modification to these concepts is necessary since the time available for preventing limit violation depends upon the power configuration within the reactor core. The reactor is controlled by inserting neutron absorbing control rods into the core from the top. If the power distribution in the core is such that a power peak is near the top of the core, control rod insertion effects are felt earlier than if the power was peaked in the bottom of the core. This phenomenon is reflected in FIG. 5. The lower curve illustrates the behavior of DNBR for the case in which the power is peaked toward the top of the core. The upper curve shows the behavior of DNBR where the power is peaked toward the bottom of the core. The minimum DNBR in both cases is 1.3; however, the curve for the case where power is peaked toward the bottom of the core starts from a slightly higher initial DNBR due to the fact that a greater time is required to halt the DNBR decrease. Therefore, the reactor should be operated either with a larger initial DNBR margin when the power is peaked in the bottom of the core, or the reactor protection system should initiate control action at an earlier time than in the case where the power is peaked in the top of the core.

Figure 1:
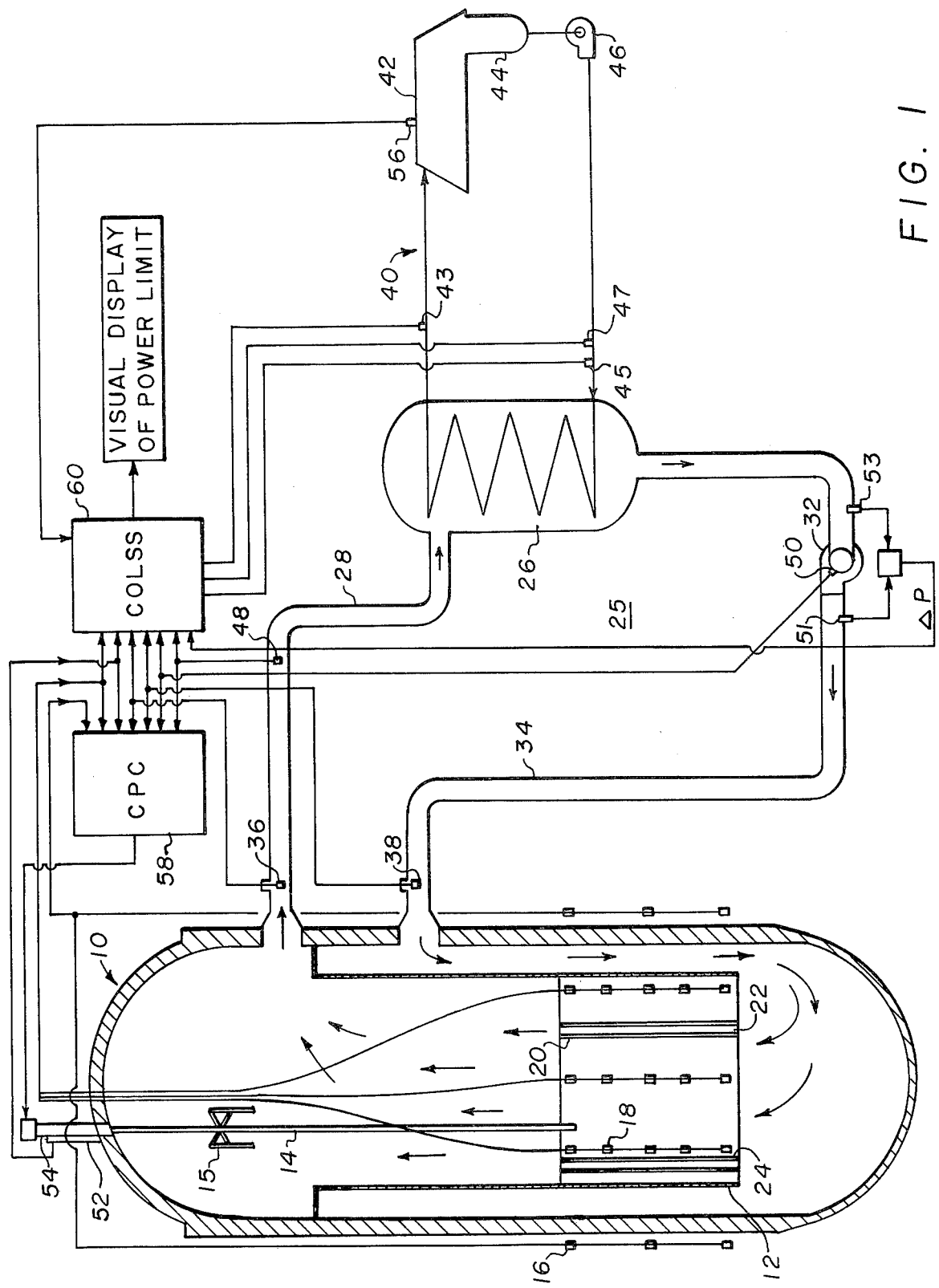
FIG. 1 is a diagrammatical representation of a pressurized water reactor and its collateral systems.

The instant invention provides means and methods for (1) maintaining a margin sufficient to avoid the violation of the critical value of the index on the occurrence of the most rapid anticipated operational occurrence and (2) predicting the imminent violation of the critical value of the index in sufficient time to allow the initiation and completion of successful control measures. FIG. 1 shows a typical pressurized reactor steam generating system with the inclusion of the margin maintaining system 60 and the protecting and predicting system 58. The reactor 10 consists of a core 12 and control rods 14 (only one of which is shown) which are movable into the core for reactor control. The core is constructed of a multitude of fuel pins 20 (only a few of which are shown) which define coolant channels 22 through which the coolant is circulated. The reactor coolant system 25 has a number of coolant loops only one of which is shown and which includes a hot leg 28 which delivers the heated reactor coolant to a steam generator 26. Heat from the heated reactor coolant is transferred to the secondary coolant in the steam generator 26 to form steam which is contained in a secondary coolant system 40. The steam is delivered to a turbine 42 which converts the thermal energy of the steam into mechanical rotation for subsequent conversion into electrical energy in a generator. The secondary coolant, after passing through the turbine, is delivered to a condenser 44 and recirculated by feed water pumps 46 back to the steam generator where it again picks up heat energy from the reactor coolant. After passing through the steam generator 26, the reactor coolant is circulated back to the reactor by reactor coolant pumps 32 and through cold leg 34. A pressurizing system (not shown) is provided to maintain the pressure of the primary coolant within certain acceptable limits. After being delivered to the reactor pressure vessel through the cold leg 34, the coolant is forced to circulate downwardly around the outside of the core 12 and upwardly through the interior of the core, through coolant channels 22, where the reactor coolant cools the core and its fuel pins 20.

Proper control of the nuclear reactor system requires the sensing of all those parameters necessary for a computation of the various design limit indices. Ex-core detectors 16 are provided to monitor the neutron flux originating in the reactor core. Such ex-core detectors are conventional, commercially available pieces of equipment such as manufactured by Reuter Stokes, Inc. of Westinghouse Electric Corp., Electronic Tube Division and the particular construction does not form a part of the invention. Also provided are strings of in-core detectors 18 for monitoring the local power of individual sectors of the reactor core. Such in-core detectors are conventional, commercially available pieces of equipment such as manufactured by Reuter Stokes Canada Ltd. and the particular construction does not form a part of the present invention. Information from the in-core detectors is necessary for the calculation of azimuthal tilt magnitude and is also used to calculate the axial power distribution. Resistance temperature detectors 36 and 38 are provided on the hot leg 28 and the cold leg 34 respectively to generate signals indicative of the temperature of the coolant as it enters the core and as it leaves the core. These temperatures are subsequently used in a calculation of $\Delta T$ and average temperature for calculation purposes in determining core thermal power. The temperature of the cold leg $T_c$ is also used in a calculation of DNBR.

Shaft speed detector 50 is positioned on the rotating shaft of the primary coolant pump 32 for the purposes of determining the speed of rotation (W) of the coolant pump shaft which can be used to calculate the coolant mass flow rate. Additional information is obtained by pressure sensors 51 and 53 which enable the calculation of the pressure head across the coolant pump. This information enables a more direct calculation of coolant mass flow rate. Also provided is a pressure sensor 48 to give an indication of the reactor coolant system pressure. Turbine 42 has a pressure sensor 56 which gives an indication of the turbine first stage pressure for the purposes of calculating a total plant power. The method for calculating total plant power from a plant load signal (turbine first stage pressure) is fully and completely disclosed in U.S. Pat. No. 3,423,285 issued on Jan. 21, 1969 to C. F. Curry, et al, the disclosure of which is incorporated herein by reference. In addition to the turbine first stage pressure sensor 56, the secondary coolant system is equipped with mainstream pressure sensor 43, feedwater temperature detector 45 and feedwater flow detector 47.

The reactor 10 and its control rods 14 are provided with a rod position detection system 54. This system is composed of two or more reed switch assemblies positioned adjacent to and outside of each control rod housing 52 that extends external to the reactor pressure vessel. The reed switches 54 are activated through the control rod housing which is made of magnetically permeable material, by a permanent magnet affixed to a control rod extension shaft. By this means the position of every control rod can be redundantly determined and logged for the purposes of determining various factors to be used in the calculation of DNBR and local power density. More specifically, CEA group position signals and CEA deviation signals are used to calculate pin and channel planar radial peaking factors (see infra.).

All of the various signals described above which describe various reactor parameters are delivered to either the calculation means 58 called the core protection calculator, the calculation means called COLSS 60, or both. The parametric signals generated for and utilized by the core protection calculator and COLSS are quite similar although minor differences exist. These differences in detail are differences which would be obvious to one skilled in the art of reactor control. Therefore, for the sake of simplification and clarity, FIG. 1 shows the same signals delivered to both the Core Protection Calculator 58 and COLSS 60. However, it should be understood that in actual practice the signals delivered to these two systems are derived from separate isolated sources. It should also be recognized that in order to meet protection criteria, the core protection calculator must be redundant with redundant input signals. The calculation means 58 and 60 may either be hard-wired analogue systems or special purpose digital computers. The core protection calculator calculates and projects a value of DNBR over a certain time period T. Similar calculations and predictions can also be made for other design limits according to this invention. The core protection calculator then compares the calculated and projected value of DNBR to a fixed setpoint indicative of the violation of the specified acceptable fuel design limit on DNBR. When the calculated and projected value of DNBR is equal to or falls below the fixed setpoint, a signal is generated by the core protection calculator 58 and is sent to the control rod control means 62 for the purposes of scramming the control rods 14 into the core thereby terminating the chain reaction within the reactor core.

Some of the variously generated signals representing the reactor parameters described above are also delivered to a calculation means 60 called the Core Operating Limit Supervisory System (COLSS). It is the function of COLSS 60 to make a very accurate calculation of a DNBR operating limit which contains sufficient margin to allow the core protection calculator to sense, calculate, predict and shut the reactor down in a timely fashion that avoids the violation of any fuel design limits. The operating limit thus generated may be utilized in either of two fashions in order to control the operation of the reactor. The first is merely to register the limit on a visual indicator 170 which would allow the reactor operator to compare the actual reactor operating condition of the COLSS limit. With this knowledge available to the operator, he will be able to operate the reactor in such a way that a sufficient margin is continuously maintained while at the same time maximizing the capability and availability of the reactor. The second method would be to automatically restrict the plant power to be within the COLSS limit thereby insuring that the necessary margin is maintained.

Core Protection Calculator

The low DNBR and high local power density trips initiated by a plurality of Core Protection Calculators of which only one is shown (see FIGS. 6 and 6a) funtion to assure that specified acceptable fuel design limits are not exceeded during anticipated operational occurrences (which are defined as those conditions of normal operation which are expected to occur one or more times during the life of a nuclear power plant). In particular, these occurrences include single electrical component or control system failures, that can result in transients which could lead to a violation of specified acceptable fuel design limits if protective action were not initiated.

The protection system is designed so that reactor core protective action will not be initiated during normal operation of the reactor. Four measurement channels are provided for each parameter monitored by the system. The four measurement channels are independent and isolated from each other as are the core protection calculators. These four channels provide trip signals to six independent logic matrices, arranged to effect a two-out-of-four coincidence logic or a two-out-of-three coincidence logic. This redundancy enables one of the four measurement and calculation channels to be taken out of service for maintenance or testing while still providing the necessary protective function for the operating reactor. In this case, the protection system logic is charged to a two-out-of-three coincidence logic for the actuation of plant protection action. It should be understood that this discussion and the functional block diagram of FIG. 6 describe only one out of the four parallel and independent protective channels.

For the purposes of illustrating the invention and for the purpose of teaching a preferred mode of operation, attention will be focused on the two fuel design limits called:
 1. A 1.3 Departure from Nucleate Boiling Ratio (DNBR) in the limiting coolant channel in the core, and
 2. The peak local power density in the limiting fuel pin in the core.

The low DNBR trip maintains the integrity of the DNBR fuel design limit and the high local power density trip maintains the integrity of the fuel design limit on peak local power density. While discussion will be focused on these two indices, it should be apparent that the invention is not so limited and applies to any design limits which may be represented by a mathematical index.

The subject trips monitor all the Nuclear Steam Supply System parameters that affect these fuel design limits. The pertinent parameters are monitored directly where possible, or indirectly by monitoring Nuclear Steam Supply System variables that can be related to the particular parameters of interest through well defined mathematical relationships. The number and location of sensors are chosen to assure that the reactor core is adequately monitored for all allowable operating configurations. The parameters of primary importance for the calculation of DNBR and local power density are the following.
 1. Reactor Core Power;
 2. Reactor Core Power Distribution;
 3. Reactor Coolant Flow Rate;
 4. Reactor Coolant System Pressure; and
 5. Reactor Coolant Inlet Temperature.

Several methods of calculation are possible and it is not intended that this invention be limited to any particular mathematical expression of the parameters used to calculate true DNBR or local power density or any other index. The discussion following is only intended to distinctly set out and describe one mode of practicing this invention. In the spirit of the foregoing statement, it should be recognized that there are various methods for determining the controlling parameters in the "hottest" pin or the "hottest" channel of the reactor core.

One extreme method is to make calculations for each and every pin and channel in the core. A comparison of the calculations for each and every pin and channel would determine which pin and which channel are limiting for the operation of the reactor. A simplification of this extreme method is to take representative samples throughout the core and make conservative approximations that assure that the selected sampling method does not overlook the "hottest" or limiting pin or channel. Either of these methods is tedious and expensive to implement. An alternative method, the one to be described in this discussion, consists of making one calculation to synthesize a psuedo "hottest" or limiting pin or channel which, by making conservative assumptions, ensures that no actual pin or channel can exceed the conditions calculated for the pseudo limiting pin or channel.

Figure 11:
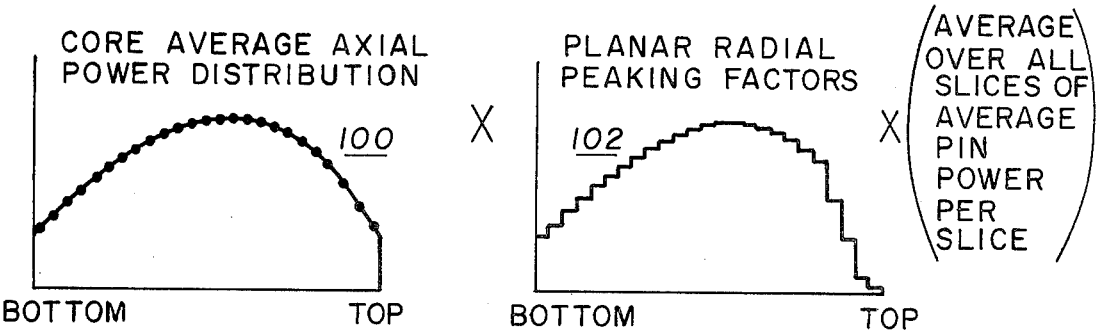
FIG. 11 is a functional chart description of the derivation of the axial power distribution and integral radial peaking factors from the absolute axial power distribution and from the absolute axial power distribution for a pseudo "hottest" pin or channel.
Figure 11:
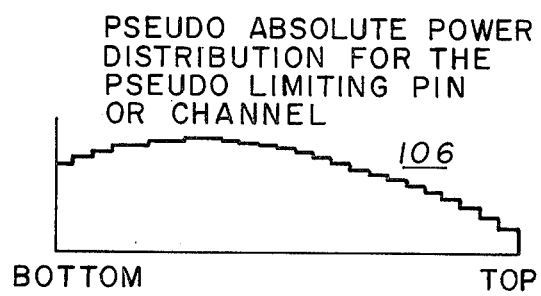
Figure 11:
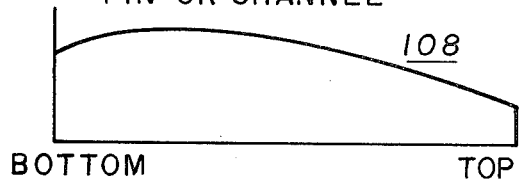
Figure 11:
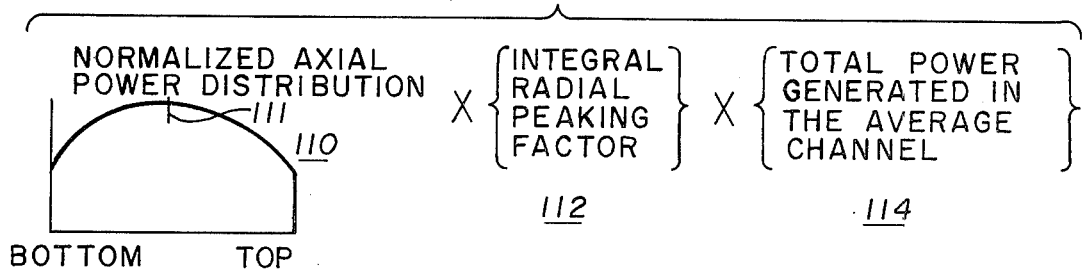

A brief mathematical description of this method of synthesizing a pseudo pin or channel follows with a detailed description of the terms and methods used in obtaining the various parameters included in the "Appendix to the Description of the Preferred Embodiment". For a better understanding of the following brief description reference may be made to FIG. 11.

In order to calculate DNBR and the KW/ft. local power density limits, the reactor core power distribution must be known. In actuality, the method for finding the absolute power distribution for one pin or channel requires the subdivision of the reactor core into its constituent parts of individual fuel pins and coolant channels. Therefore, the function to be calculated is "the absolute power distributions for the limiting pseudo pin or channel" which is a function varying with axial position along the channels (see 108 in FIG. 11). In the interest of simplification, the following discussion will refer only to the channel and not make reference to the associated fuel pin. Mathematically, this term, the channel absolute power distribution 108, can be factored into three independent terms, two of which are constants, and one of which is a function dependent on axial position or the z coordinate. The function term is defined to be "the normalized channel axial power distribution" 110. This function can be thought of as a curve indicative of power which begins at the bottom of the core ($z=0$) and ends at the top of the core ($z=1$). Every value of this function, the normalized channel axial power distribution 110, or every part of the curve generated by this function is called a "channel axial peaking factor". The one point on the curve generated by the function which represents the point of maximum power generation is called "the channel axial peaking factor" 111.

The constant terms factored out of the "channel absolute power distribution" are selected to normalized the axial power distribution curve 110 or, restated, the constant terms are chosen so that the integration of the "channel axial power distribution" 110 from the bottom of the core ($z=0$) to the top of the core ($z=1$) gives a value of unity. The two constants which have been factored out of the "channel absolute power distribution" to give the "normalized channel axial power distribution" are called the "integral radial peaking factor" 112 and the "total power generated in the average channel" 114. The "integral radial peaking factor" 112 is defined to be the ratio of the power generated in the referenced channel to the power generated in the average core channel.

In order to synthesize the limiting pseudo channel, a method is developed for generating a "pseudo absolute power distribution for a pseudo channel" 106. In order to mathematically do this, the core is thought of as being a right cylindrical solid which has been divided into slices along the z axis with each slice having a thickness of dz (see FIGS. 11a and 11b). This mathematical manipulation allows each slice to be treated as a two-dimensional mode; the core, therefore, comprises a simple summation of all of the two-dimensional slices. For each slice a ratio of the power of the "hottest" pin in that slice to the average power of all of the pins in that slice is generated. (See FIG. 11a.) This ratio is called the "planar radial peaking factor". The "planar radial peaking factor" is analogous to the "channel axial peaking factor" discussed above for a single channel with the exception that there exists one "planar radial peaking factor" for each slice. If all of the planar radial peaking factors for all of the slices of thickness dz are plotted on a curve, thereby melding the "hottest" pins in each slice into a single pseudo pin (see FIG. 11b), the result is a step curve which varies with axial position 102. The step function 102 generated by the "planar radial peaking factors" may be multiplied by the "core average axial power distribution" 100 which is a z dependent function and the "average over all slices of average pin power per slice" 104, which is a constant for one set of reactor operating conditions. This former term, the core average axial power distribution, is a cross-plot of the linear power density in each axial slice versus the axial position of the slice, with appropriate normalization such that integration of the curve from $z=0$ to $z=1$ gives a value of unity. This latter term, the "average over all slices of average pin power per slice" 104 is a number proportional to the total power generated in the core. The function which results from the multiplication of the function generated by the "planar radial peaking factors" 102, the "core average axial power distribution" 100 and the "average over all slices of average pin power per slice" 104 is the "pseudo absolute power distribution for the pseudo limiting pin or channel" 106.

In this way a pseudo pin can be generated representing the worst possible power distribution or the power distribution for the limiting pin, since the hottest pins in each slice have been stacked into one pseudo pin extending through all of the slices (see FIG. 11b). Once this "pseudo absolute power distribution for the pseudo limiting pin" 106 has been generated, it may then be factored into a normalized axial power distribution 110 and an integral radial peaking factor 112 for the pseudo limiting pin just as in the case for an actual pin. The purpose of mixing these calculations is to obtain a normalized axial power distribution $F_z(z)$ and an integral radial peaking factor $F_r$ which are two of the input signals necessary for the calculation of the DNBR index and the KW/ft. local power density index according to functional equations (1) and (2) which appear in the "Background of the Invention". The above concepts are discussed in greater detail in the "Appendix to the Description of the Preferred Embodiment".

Figure 6:
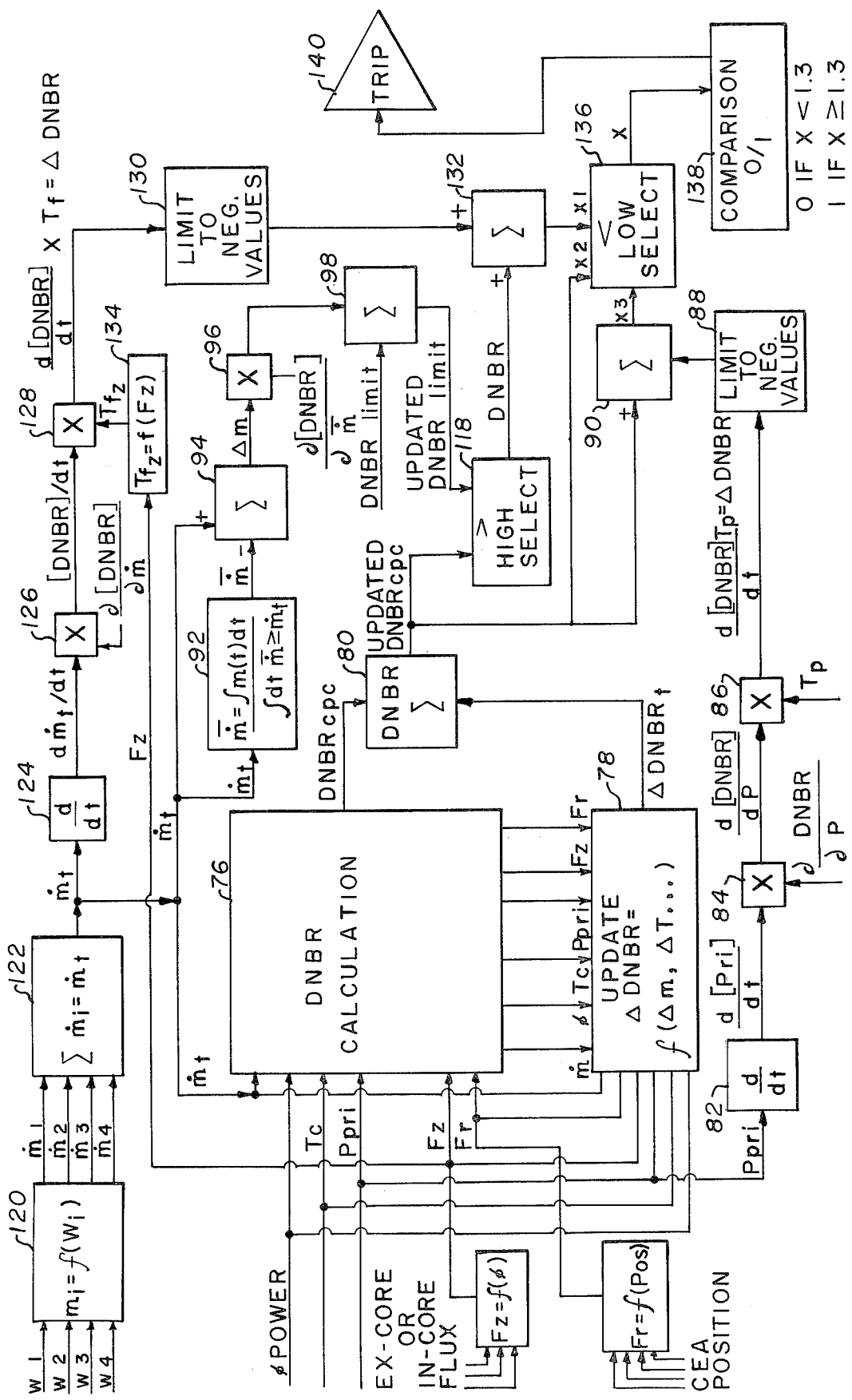
FIG. 6 is a block diagram of the core protection calculator.

Referring now to FIG. 6, the method used by the core protection calculator will be described. A calculation of DNBR is made in functional element 76 according to the equation:

$$DNBR = f(\phi, \dot{m}, P, T_c, F_z(z), F_r, T_r)$$

where
$\phi$ = core power,
$\dot{m}$ = coolant mass flow rate;
P = reactor coolant system pressure;
$T_c$ = cold leg temperature;
$F_z(z)$ = axial power distribution;
$F_r$ = integral radial peaking factor; and
$T_r$ = azimuthal tilt magnitude. An explanation of $\phi$, $F_z(z)$, $F_r$ and $T_r$ is to be found in detail in the "Appendix to the Description of the Preferred Embodiment."

The signals are monitored by the DNBR calculated 76 and a snapshot is taken of these signals approximately every two seconds. The snapshot values are used in a calculation of DNBR which takes approximately 2 seconds. The two to four second old indication of DNBR which results is not sufficiently responsive to the actual condition in the reactor core to allow adequate core protection; therefore, means are provided for continuously updating this basic DNBR calculation. For the purposes of this discussion and claims, the word "continuously" should be taken to mean "of a periodicity which is substantially higher than the frequency of the periodic calculation". The values of each of the parameters used in the most recently completed periodic snapshot calculation of DNBR are compared at 78 with the continuously monitored parameters. This comparison results in an update change in parameter for each of the parameters used in the DNBR calculation of element 76. Element 78 then multiplies each change of parameter by a value which conservatively converts each change of parameter into a change of DNBR. An example of the type of multiplication which may be made is the multiplication of change in temperature by a value which is equivalent to the partial derivative of the DNBR equation with respect to temperature. The partial derivative may either be taken to be a constant value or it may be taken to be a function which is dependent upon all other parameters except T, the choice depending upon which multiplication gives a more satisfactory result. After element 78 generates a change in DNBR for the change in each parameter, all of the changes in DNBR are summed to obtain a net change in DNBR. This net change in DNBR and the snapshot calculation of DNBR are added in element 80, the result being a continuously updated value of DNBR which is dynamically responsive to changes in the reactor core.

The above described calculation standing alone is not sufficient for the function of protecting the reactor core. The reason for this is that it is not sufficient merely to know what the DNBR is but it is necessary to be able to predict what the DNBR will be far enough in advance to allow the initiation and completion of corrective action that will avoid limit violation. Therefore, a projection of DNBR must be made. The projection is accomplished by elements 82, 84 and 86 of the Core Protection Calculator. These elements sense the dynamic response of one of the reactor parameters and take the slope or the rate of change of the parameter with respect to time. This slope or rate of chage is then projected over a period of time T. In this manner, a projection of change of DNBR may be calculated on the basis of the instantaneous rate of change of one of the reactor parameters. Projections of the rate of change of each parameter are continuously made, thereby providing a continuous projection of change of DNBR. Now, referring to FIG. 6 element 82 takes the derivative of the parameter, for example pressure, with respect to time. Element 84 then multiplies the derivative of the signal with respect to time by a value which is proportional to the partial derivative of DNBR with respect to the parameter being projected. The product of these two terms is a term indicative of the change in DNBR with respect to time due to the change in the parameter in question. This change in DNBR with respect to time is then multiplied by a time period $T_p$ to obtain a projected change in DNBR. The time period over which the change in DNBR is projected is a period which is calculated to allow the sensing, calculating and predicting of a limit violation and to allow the initiation and completion of corrective action before the violation of a design limit all of which represent system inertia or system reaction time. The time period T is illustrated in FIG. 2. It should be recognized from FIG. 5 and from the discussion above that the multiplicative time period T may have to be modified depending upon the power distribution within the core.

The projected change in DNBR which has been derived by elements 82, 84 and 86 is then limited to negative values in element 88 before it is summed in element 90 with the calculated value of DNBR of element 80.

A calculation similar to the one which has just been described may be made for any of the reactor parameters on which DNBR depends. In actual operation, it is likely that the dynamic response of DNBR to changes in coolant temperature, axial power distribution, integral radial power distribution, and azimuthal tilt magnitude will not be fast enough to require the projection techniques just described. However, it is likely that the parameters of core power, reactor coolant system pressure and coolant mass flow rate will be projected as above since DNBR is very responsive to changes in these parameters.

It is indeed likely that DNBR will be so responsive to changes in coolant mass flow rate that a technique for desensitizing the DNBR response should be provided in order to avoid unnecessary reactor trips. In order to do this, the core protection calculator may take advantage of the presence of a system similar to COLSS which insures that an appropriate margin to the fuel design limit will be maintained. It is a characteristic of the COLSS system that it need not be as dynamically responsive to changes in reactor parameters as the core protection calculator since COLSS assures that adequate margin is maintained to fuel design limits only during normal operation. The core protection calculator, on the other hand, must be dynamically responsive to changes in reactor parameters in order to adequately protect the reactor core during anticipated operational occurrences. The differences between these two systems mandate an extremely fast, although approximate, core protection calculation of DNBR and predicted DNBR, and a slower but extremely accurate COLSS DNBR calculation. Therefore, it is a possibility that the approximations made to allow a rapid and dynamic calculation of DNBR in the core protection calculator may result in a value of DNBR that is less accurate than the values of DNBR calculated by COLSS. Advantage may be taken of these calculational differences to provide a method to desensitize the responses of the core protection calculator value of DNBR to changes in the coolant mass flow rate.

A brief description of this desensitization process follows. The DNBR value calculated by COLSS which includes an operating margin is used as the static base value of DNBR to which continuous instantaneous modifications are made rather than that value of DNBR which is periodically calculated by the core protection calculator. This statis base value of DNBR called $DNBR_{limit}$ is then updated to make it responsive to changes in coolant mass flow rate to obtain an updated value of DNBR. This updated value of DNBR is then compared to the updated values of DNBR obtained from the above-described periodic calculation and the higher of the two values is selected. To this higher value is added a projected change in DNBR which is obtained in a projection procedure similar to that described above for a projection of primary pressure.

Reactor coolant pump speed signals ($W_i$) are continuously delivered to element 120 along with the cold leg temperature and the reactor coolant system pressure where a calculation is made converting these signals into coolant mass flow rate signals ($\dot{m}_1$).

Figure 7:
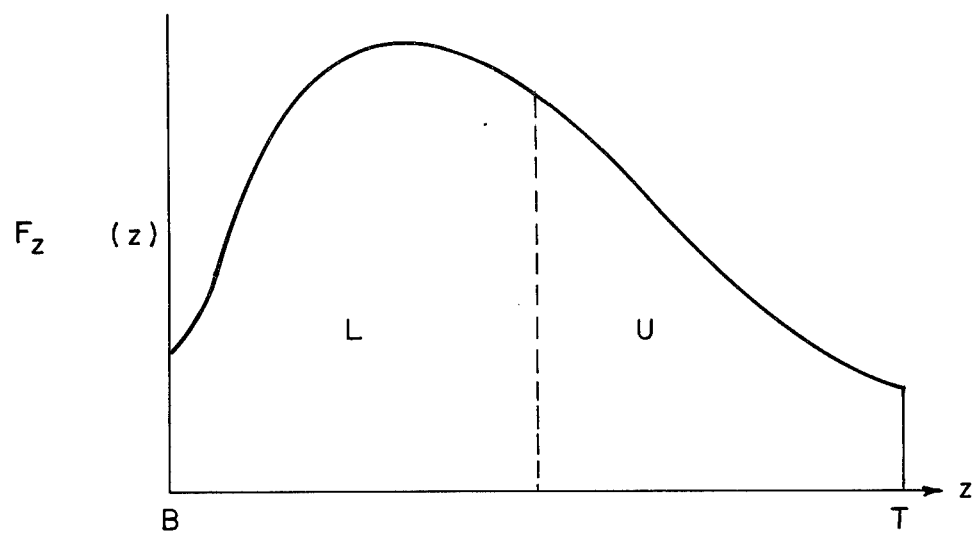
FIG. 7 is a chart illustrative of axial shape index as obtained from the axial power distribution.
Figure 8:
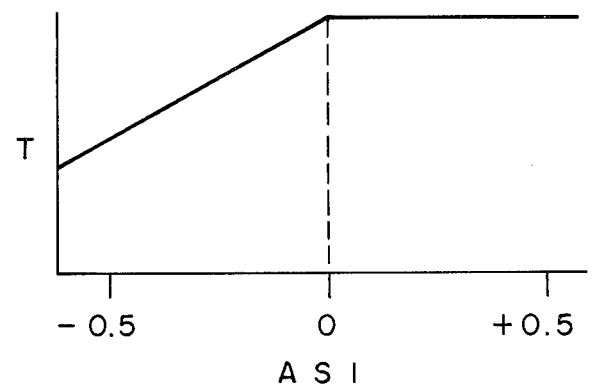
FIG. 8 is a plot of axial shape index versus T where T is the time over which the core protection calculator makes its predictions. This plot shows one possible functional relationship between axial shape index and T.

FIG. 6 shows four sets of signals from the useful configuration of four reactor coolant pumps. Element 122 sums the four mass flow rate signals ($\dot{m}_i$) to produce a total coolant mass flow rate signal ($\dot{m}_t$). In a series of steps similar to the pressure signal projection sequence described above, the derivative of $\dot{m}_t$ is taken at 124 with respect to time to get the rate of change of $m_t$. This value is then multiplied by the partial derivative of DNBR with respect to the mass flow rate at 126 to obtain a signal indicative of the rate of change of DNBR due to the rate of change of the coolant mass flow rate. Next, a projection of the change of DNBR over a period of time T is made in element 128 by multiplying the signal indicative of the rate of change of DNBR with respect to time by a period of time T. Just as in the example described above for the projection of DNBR due to changes in pressure, the value of T may be dependent on the axial power distribution that exists in the reactor core. Thus, element 134 generates a time period $T_{fz}$ as a function of axial power distribution. There are numerous acceptable ways that element 134 can handle this function generation. A suggested preferred mode is illustrated in FIGS. 7 and 8. FIG. 7 is a plot of axial power distribution $F_z(z)$ from the bottom to the top of the core. The core is divided into two equal parts; the lower half of the core and the upper half of the core. The axial power distribution is integrated in element 134 over each half to get two numbers symbolized by L and U meaning lower and upper halves. FIG. 7 represents a reactor configuration in which the axial power distribution is weighed more heavily toward the bottom of the core. In such a situation the area under the axial power distribution curve toward the bttom of the core, L, would be larger than that at the top of the core U. By using these two values, L and U, an Axial Shape Index can be generated which gives a single number indicative of the axial power distribution. One possible axial shape index can be generated by the following equation:

$$ASI = (L - U)/(L + U)$$

An examination of this equation shows that the Axial Shape Index will be negative when the power distribution is peaked toward the top of the core, and positive when the power distribution is peaked toward the bottom of the core. FIG. 8 shows one way in which this fact may be utilized to generate a time period T which is a function of the axial power distribution. The shape of the curve plotted with Axial Shape Index versus T is chosen by the reactor designers to make best use of the fact that it takes less time to terminate the reactor's nuclear chain reaction when the power is peaked in the top of the core. Thus, the greater the power peak in the top of the core, the larger is the negative value of the Axial Shape Index. The curve of FIG. 8 shows that T decreases with larger and larger negative values of Axial Shape Index.

Once the projection of change in DNBR is obtained, it is limited to negative valves in element 130 (for the sake of being conservative) and is then added to an updated base value of DNBR in element 132. The appropriate updated base value of DNBR is the larger of either the value computed by the periodic sampling method described above and which is computed in elements 76, 78 and 80, or the value computed by using a fixed base value of DNBR which includes an operating margin. For the sake of simplifying the discussion, this base value of DNBR, which includes a margin, will be called $DNBR_{limit}$ and may be found on FIG. 6 as an input to element 98. The $DNBR_{limit}$ value is a constant that may be determined once the typical characteristics of the reactor protection equipment are determined. The functioning of the COLSS margin system will be described, infra, following the completion of the discussion of the core protection calculator. The inclusion of the $DNBR_{limit}$ value as a base value for the desensitization of the response of DNBR to the coolant mass flow rate is justified by the fact that when the reactor is operated on the basis of the COLSS margin, as it should be when operated on a steady-state basis, then reactor conditions should always be such that this margin exists.

The $DNBR_{limit}$ must be dynamically updated for recent changes in DNBR. The following is a description of the preferred method for accomplishing this update. The values of $\dot{m}_t$ (total coolant mass flow rate) are continuously fed to element 92 where the following calculation is made. The mass flow rate is continuously integrated over a priod of time which is long compared to typical transients which effect the parametric value of mass flow rate. The value obtained from the integration is continuously divided by the same time period over which the integration was made, thereby generating an average value of coolant mass flow rate over the stated period of time ($\bar{\dot{m}}$). This flow average value ($\bar{\dot{m}}$) is then compared in element 94 to the instantaneous value of coolant mass flow rate ($m_5$) to obtain a recent deviation of mass flow rate ($\Delta\dot{m}$) from the long term average value of mass flow rate. If the deviation is negative, i.e., $\bar{\dot{m}}$ less than $\dot{m}_t$, the value of the mass flow rate integral ($\bar{\dot{m}}$) is automatically increased such that $\bar{\dot{m}} = \dot{m}_t$. In element 96 $\Delta\dot{m}$ is multiplied by the partial derivative of DNBR with respect to the coolant mass flow rate ($\dot{m}$). The product of this multiplication is a value indicative of any decrease in DNBR ($\Delta DNBR$) due to any recent decrease of coolant mass flow rate from the long term average value of mass flow rate. The derived $\Delta DNBR$ is then used as the value which updates the $DNBR_{limit}$ in element 98 to give an updated value of $DNBR_{limit}$. A signal representing $DNBR_{limit}$ is then sent to element 118 where it is compared to the updated DNBR value which has concurrently been calculated in elements 76, 78 and 80. Element 118 selects the higher value of the two updated DNBR signals to be used as the value to which the projected change in DNBR over time T is to be subtracted in element 132 to generate a predicted value of DNBR T seconds into the future due to a projected change in coolant mass flow rate.

At this point in this description, two values of predicted DNBR have been described as having been generated in elements 90 and 132. Element 136 selects the lower value of all of the predicted values of DNBR and element 138 compares that selected low value to the critical value of DNBR (1.3). If the predicted value is equal to or less than the critical value of DNBR, then a signal is sent to element 140 which generates a signal for tripping the reactor. The tripping action de-energizes the electromagnetic circuits on a magnetic jack control rod drive mechanism and the control rods are allowed to fall into the reactor core.

Figure 6A:
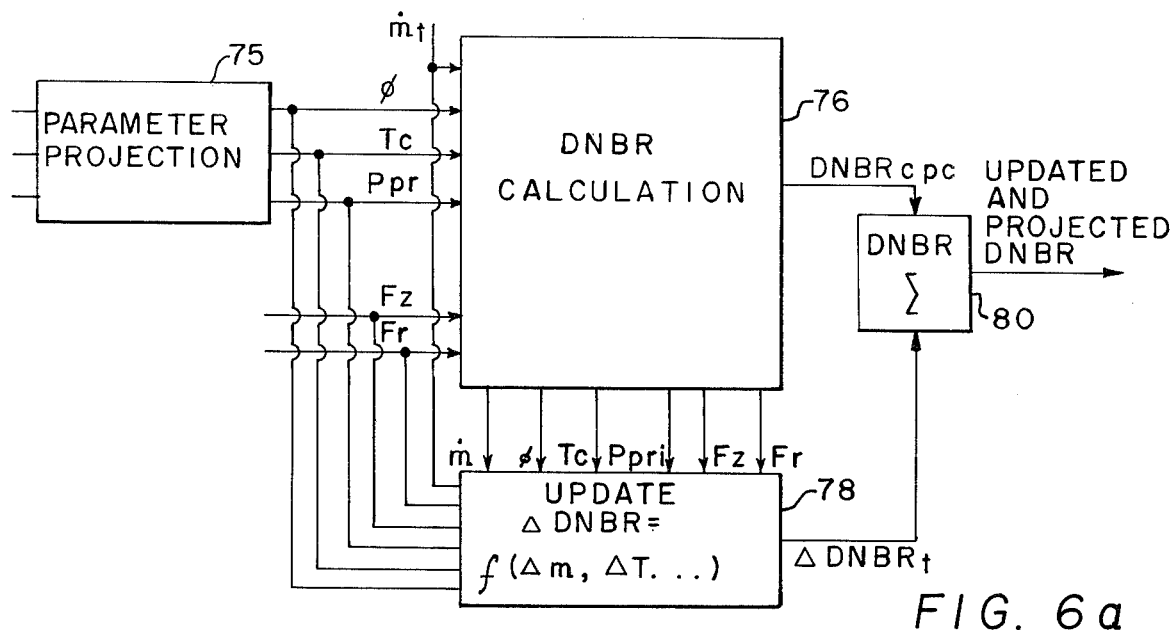
FIG. 6a is a block diagram of a second embodiment of the core protection calculator.

A second embodiment of the core protection calculator 58 appears in FIG. 6A. In this embodiment, the same signals are generated as inputs with the exception that one or more of them are modified in element 75. Element 75 generates signals which are dynamically commensurate with the parameters that the fuel design limit is most closely related to; these dynamically compensated signals are then projected over time T. The time projection technique described in the first embodiment as occurring in elements 82, 84 and 86 is thus handled by element 75. The net result of this modification is that elements 82, 84 and 86 have been embodied in new element 75 and the dynamic compensation and time projection is made before the DNBR calculation and update are made in elements 76 and 78. Thus, the DNBR calculation and update are calculations which work with at least one parameter which has been dynamically compensated and projected into the future, resulting in a calculation of projected DNBR.

Core Operating Limit Supervisory System (COLSS)

The function of the Core Operating Limit Supervisory System is to insure that the nuclear reactor is operated with sufficient margin to critical core design limits so that the Reactor Protection System has time to terminate an incident (anticipated operational occurrence) before the violation of a fuel design limit. The method and apparatus described herein can be adapted to calculate a limiting value of a reactor parameter which encompasses such a sufficient margin. This method is applicable to any design limit; however, for the sake of simplification, the following discussion will be focused primarily on fuel element clad integrity and overheating as indicated by the occurrence of departure from nucleate boiling and the appropriate index, DNBR.

Figure 10A:
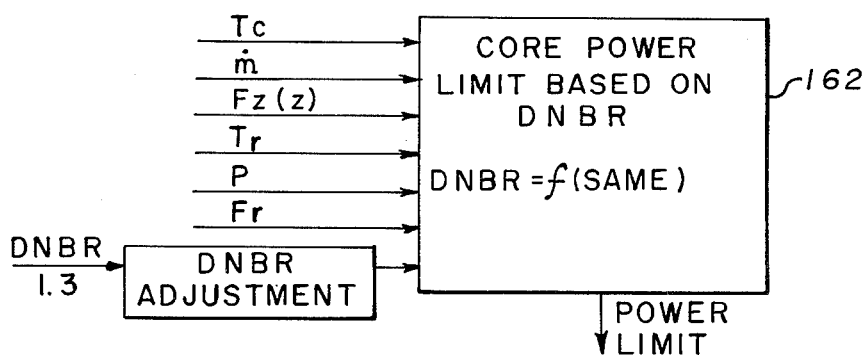
FIG. 10a is a block diagram of the COLSS with a modification made to the DNBR setpoint.

As described above, DNBR is a function of a number of either measured or calculated reactor parameters and may be expressed in the functional notation:

$$DNBR = f(\phi, T_c, P, \dot{m}, F_r, F_z(z), T_r)$$

where $\phi$ = core power in percent of full power;
$T_c$ = coolant inlet temperature;
$P$ = coolant pressure;
$\dot{m}$ = coolant mass flow rate;
$F_r$ = integral radial peaking factor;
$F_z(z)$ = axial power distribution; and
$T_r$ = azimuthal tilt magnitude. A detailed description of how core power, axial power distribution, integral radial peaking factors and azimuthal tilt magnitude are generated appears in the "Appendix to the Description of the Preferred Embodiment". The critical value of DNBR is 1.3 (or 1 depending on the definitions used). One possibility for operating the reactor with a sufficiently large margin (see FIG. 4) is to make sure that the reactor is operated at a DNBR value (say 1.8) which is sufficiently distant from the critical value of 1.3 to allow enough time to sense the occurrence of an accident, predict the effect of the occurence of the accident and take appropriate protective action, such as scramming the reactor. Using this approach, the value of one of the parameters on which DNBR, if functionally dependent, (for example, core power) may be calculated from the above equation by using the false input of 1.8 for DNBR (see FIG. 10A). The result of the on-line calculation is a false value of the parameter which is then used as an operating limit. This calculated false parameter (power) or limit is then displayed to the operator informing him that if he were to allow the actual reactor power to exceed the computed false power or power limit, then the DNBR margin would be less than that required for the avoidance of design limit violation on the occurrence of an anticipated operational occurrence. At this point the operator has at least two choices. He can cause control rods to be inserted into the reactor, thereby resisting actual reactor power until the actual power no longer exceeds the power limit, or, he can cause variations in one of the other parameters on which DNBR is dependent, such as inlet temperature $T_c$, coolant pressure P, or coolant mass flow rate $\dot{m}$, in such a way as to raise the computed power limit (i.e., increase the existing DNBR margin) so that the actual power no longer exceeds the computed power limit.

Figure 10B:
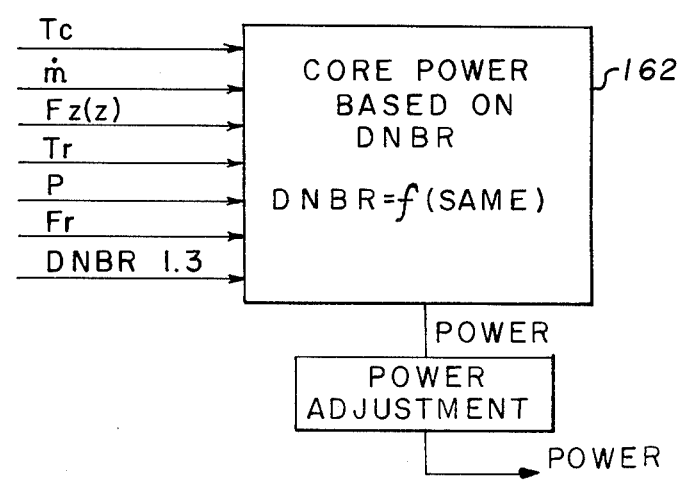
FIG. 10b is a block diagram of COLSS with a modification made to the calculated power.

In the above described procedure and calculation, the variables in the DNBR equation were treated in three distinct ways: (1) one variable (DNBR) was modified (from 1.3 to 1.8); (2) one variable (power) was calculated as the unknown, the solution for which gave a limit, and (3) the remaining variables were treated as known values whose true values were used in the calculation of the limit on the basis of the false or modified input. It is mathematically possible, and perhaps desirable to switch the variables and their roles. Thus, an operating limit may be calculated for the temperature variable rather than for power. In this case, a temperature limit is obtained by utilizing the actual reactor power in the calculation and then the temperature limit is compared to the actual temperature by the operator just as in the case described above for the power limit and the actual power. Another way in which a power limit may be obtained is to generate as input signals the true values for all the variables (except power) including a DNBR signal of 1.3. The calculation results in an actual power which may then be modified to obtain an adjusted power or power limit which encompasses an operating margin. (See FIG. 10B).

Another way in which a modification can be made to incorporate an operating margin is the modification of one of the other variables, such as coolant mass flow rate, rather than the DNBR inex or the power. In fact, in practical application, it turns out that the more desirable method is to falsify the coolant mass flow rate signal rather than the DNBR value, and to iterate on reactor power as the calculated operating limit. Therefore, as the preferred mode of practicing this invention, FIG. 10 illustrates the method described above with the coolant mass flow rate being modified to build in a margin which is then used in calculating a core power operating limit.

Figure 10:
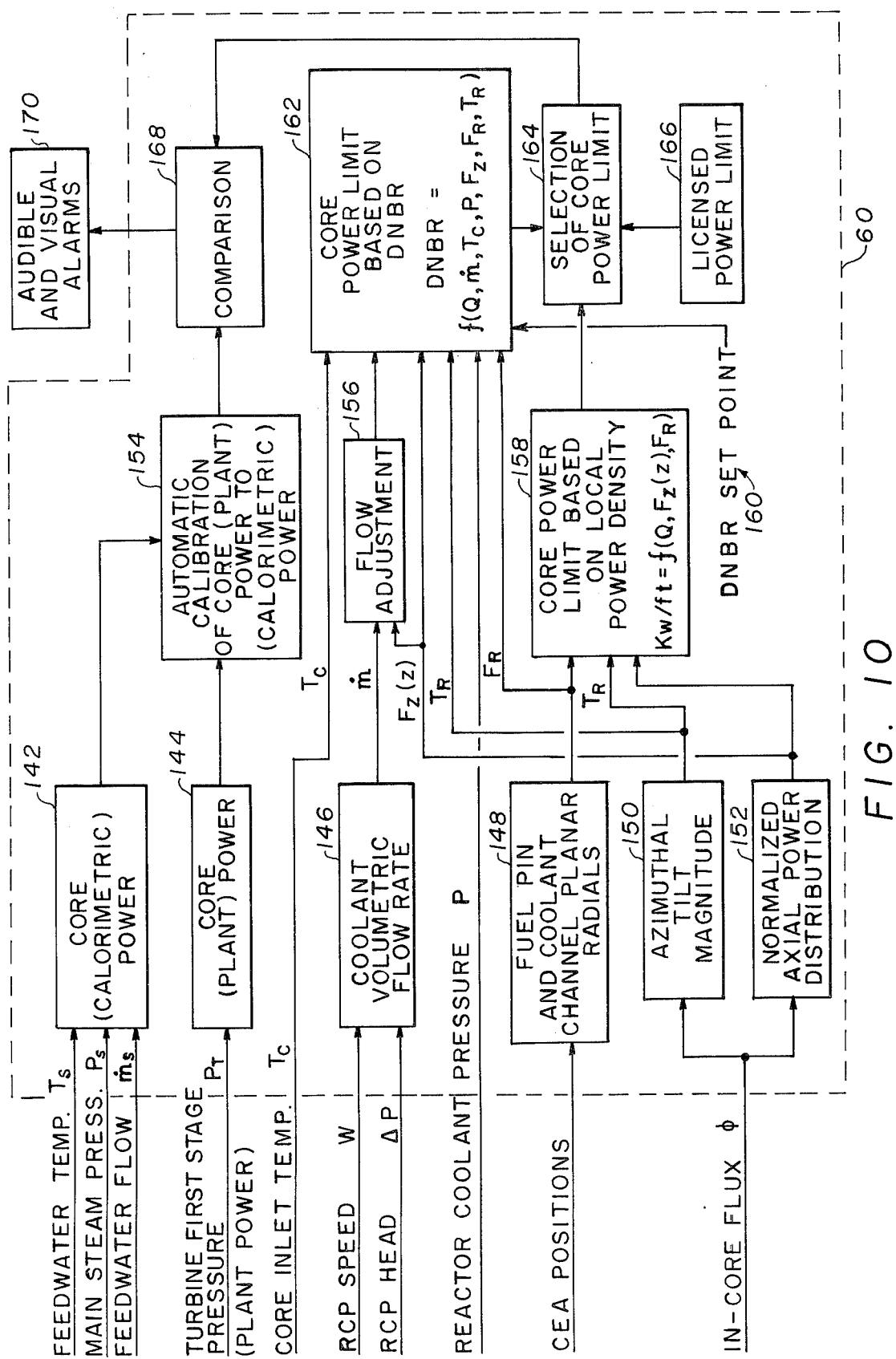
FIG. 10 is a block diagram of the core operating limit supervisory system (COLSS) with a modification made to the coolant mass flow rate input signal.

Referring to FIG. 10, the inputs of feedwater temperature ($T_s$), mainstream pressure ($P_s$), feedwater flow ($\dot{m}_s$), turbine first stage pressure ($P_t$), core inlet temperature ($T_c$), reactor coolant pump speed (W), reactor coolant pump head ($\Delta P$), reactor coolant pressure ($P_{pri}$), CEA positions, and in-core flux ($\phi$) are delivered to the core operating limit supervisory system (COLSS) 60. From these signals, core calorimetric power 142, core plant power 144, coolant volumetric flow rate (m) 146, fuel pin and coolant channel planar radials ($F_r$) 148, azimuthal tilt magnitude ($T_r$) 150, and normalized axial power distribution $F_z(z)$ 152 are computed. See U.S. Pat. No. 3,752,735 entitled "Instrumentation for Nuclear Reactor" as an illustration of one prior art technique for the derivation of core calorimetric power. See U.S. Pat Nos. 3,423,285 and 3,356,577, which patents are illustrative of the prior art techniques for computing core (plant) power from turbine first stage pressure and for automatically calibrating the core (plant) power to core (calorimetric) power respectively. The signals indicative of fuel pin and coolant channel planar radials, azimuthal tilt magnitude and normalized axial power distribution are computed as described in the "Appendix to the Description of the Preferred Embodiment". One of the totality of generated signals is modified by a factor which is calculated to build a margin into the operating limit to be computed. For purposes of this description, the variable chosen to be modified is the coolant flow rate, $\dot{m}$, as shown in element 156.

The modification made in element 156 is of the general form $$\dot{m}_{adj} = \dot{m}[f(\text{reactor condition})]$$

where m is the true value of the coolant flow rate and f(reactor condition) is the modification increment which falsifies the flow rate to generate an adjusted flow rate $\dot{m}_{adj}$. One possible modification function, f(reactor condition) is $[+\Delta m/\dot{m}]$.

The value of $\Delta m$ is a value which is a function of reactor reaction time or system inertia including delays in sensing, calculating, predicting and actuating the reactor's protection mechanisms and which also varies with the reactor core axial power distribution similar to the way in which T varied in the discussion of the projected technique supra. If the core power is peaked toward the top of the core, effective control of the core's chain reaction may be accomplished in a shorter time than if the core power were peaked in the bottom of the core. Thus, with the peak toward the top of the core, a smaller margin is adequate to ensure that timely control action may be taken than for the case in which the power is peaked toward the bottom of the core. The functional dependence of $\Delta m$ on axial power distribution may be developed by using the Axial Shape Index and a technique which is similar to that described for the T dependence on axial power distribution discussed above in the description of the core protection calculator.

Using the signals generated from the various input parameters, including the adjusted coolant flow rate signal, an operating limit ($\phi$-power) is calculated in element 162 according to the equation:

$$DNBR = f(\phi, \dot{m}_{adj}, T_c, P, F_z(z), F_r, T_r).$$

A similar core power limit based on local power density or any other design limit may also be calculated in element 158 and additional elements (not shown) in accordance with the equation $$KW/\text{ft.} = f(Q, F_z(z), F_r)$$

or an appropriate alternative equation. A similar signal modification (not shown) could be made for this calculation.

The signals from elements 142 and 144 representing core (calorimetric) power and core (plant) power respectively are delivered to element 154 where the core (plant) power is automatically calibrated to the core (calorimetric) power. The resultant signal generated by element 154 is a signal representative of the actual power of the reactor. This signal is compared to the lowest power limit available. FIG. 10 shows three available power limits, one generated in element 162 by the DNBR equation, one generated in element 158 by the KW/ft. equation and one determined by the licensed power limit as generated in the element 166. These three (or more) power limit signals are compared and the lowest selected in element 164 for comparison with the actual power as generated in element 154. If the comparison indicates that the actual power is in violation of the power limit, then an alarm means 170 is activated alerting the operator that remedial action is required.

Core Protection Calculator and the Core Operating Limit Supervisory System

Figure 9:
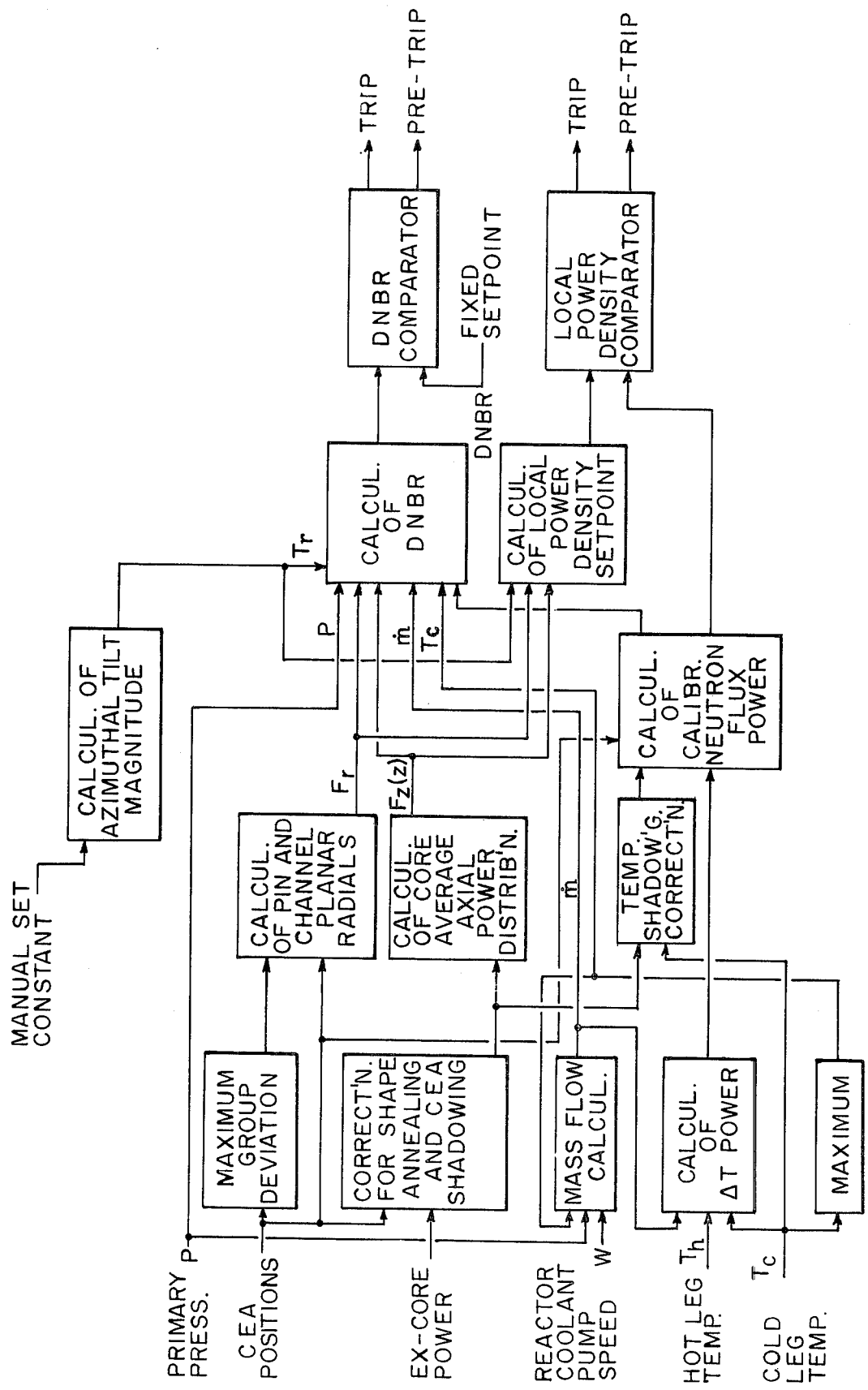
FIG. 9 is a block diagram of calculations which must be made to obtain the inputs of the core protection calculator.

The third invention herein disclosed consists of the combination of the Core Protection Calculator 58 and the Core Operating Limit Supervisory System (COLSS) 60. See FIG. 1, FIG. 6 and FIG. 9. The combination of these two systems creates a symbiotic relationship designed to protect the nuclear reactor 10 from design limit violations, both in steady-state operation and during the transients caused by anticipated operational occurrences. The combination of the Core Protection Calculator 58 and the COLSS 60 systems takes advantage of each of their design characteristics. The Core Protection Calculator 58 is a protection device which must respond rapidly to system transients so that safety and system design limits are not violated. This system not only be rapidly responsive to reactor system transients, but the protection system must also be redundant so that a single failure cannot prevent the required protective action from occurring. In order to meet these requirements, the core protection calculator has been designed to consist of four mini-computers, each mini-computer comprising an independent and redundant channel. Increasing cost for increasing computer complexity and the need for rapid response requires the core protection calculator 58 mini-computers to be limited in their degree of calculational accuracy. The COLSS system 60, on the other hand, need not include either the characteristics of system redundancy or rapid response. Therefore, COLSS calculations may be made in a high powered plant computer at a relatively slow rate of calculation with the highest degree of accuracy which can possibly be achieved. As a result, the operating limit values calcuated by COLSS are much more accurate than the calculations made by the core protection calculator.

By recognizing these differences, utilization of the two systems may be made in a way that takes advantage of the strong points of each. Therefore, reactor steady-state operation is based on the slow, although very accurate, operating limit calculated by COLSS. As has been described above, this limit is a value which provides sufficient margin to the design limits to allow the core protection calculator to respond to an incident and terminate the reactor core chain reaction before the design limits are violated. Due to the inaccuracies of the core protection calculator and the need to provide allowances for them, the core protection calculator will normally indicate that the reactor is running closer to a specified limit than would be indicated by the COLSS. When this is the case, the reactor tripping system will be conservative and will trip the reactor before a trip is actually required. This unavoidable behavior is acceptable since it represents increased conservatism and does not raise the potential for design limit violation. For most efficient operation, the core protection calculator must be made sufficiently accurate to avoid reactor trips on normal parameter fluctuations which are expected to occur during steady-state operation of the reactor system at the COLSS operating limit.

In the above described manner, COLSS and the core protection calculator operate hand-in-hand to assure the efficient and safe operation of the nuclear reactor system. The Core Protection Calculator 58 projects ahead in time a prediction of DNBR and trips the reactor when the predicted value is seen to violate the design limit. COLSS calculates a parametric limit value which incorporates a margin, and on the basis of which the reactor should be operated. When both of these systems are joined in combination, the reactor can be operated in a safe and efficient manner.

While a preferred embodiment has been shown and described, various modifications and substitutions may be made thereto without departing from the spirit and scope of the present invention. Accordingly, it is to be understood that the present invention has been described by way of illustration and not limitation.

The following "Appendix to the Description of the Preferred Embodiment" is a description of the generation of some of the input signals used in the above described calculation. In reading the appendix, it may be helpful to refer to FIG. 9 and to FIG. 11.

Appendix to the Description of the Preferred Embodiment

Methods Used to Determine Core Power Distributions

The axial heat flux distributions in the channels 22 and the local power density distributions in the fuel pins 20 are dependent upon the core power distribution. The core power distribution can be thought of as being composed of three distinct components:
 a. core average power;
 b. normalized core average axial power distribution; and
 c. normalized radial power distribution.

The method used to define the "hot" pin and "hot" channel power distribution consists of measuring core average power, synthesizing the normalized core average axial power distribution from out-or-core neutron flux signals and synthesizing the radial peaking factor from CEA 14 position measurements.

Normalized Core Average Axial Power Distribution

A normalized axial flux distribution is synthesized from the response of the ex-core detectors 16 and corrected for shape annealing and rod shadowing in order to determine a core average normalized axial power distribution. The ex-core detectors 16 are sensitive to the leakage neutron flux from the reactor core 12. The neutron flux seen by each of the three axially positioned detectors 16 is dependent upon the axial flux distribution near the core periphery, the radial flux distribution near the core periphery, and the diffusion and capture of neutrons leaking from the core periphery to the point of incidence with the ex-core detectors 16.

Shape annealing, or the relative effect of contributions of the core peripheral axial flux distribution to a given detector, is due to the placement of the detector 16 away from the core periphery 12. The detectors "see" a distorted peripheral flux distribution due to the scattering and diffusion of neutrons between the periphery and the detector locations. The shape annealing factors are dependent only upon the geometric location of the detectors 16 and do no depend on the axial flux distribution.

Rod shadowing is the effect of rod insertion on the peripheral axial flux distribution relative to the core average power distribution. Rod shadowing factors are dependent upon the rods 14 inserted in the core 12.

Since the ex-core detectors 16 primarily measure the flux distribution of the peripheral fuel elements 24 and since the detectors 16 are located a fixed distance from these elements 24, correction factors in the form of rod shadowing and shape annealing are required to obtain the core average axial power distribution in the core 12 from the flux distribution at the detectors.

Calculation of Normalized Core Average Axial Power Distribution

The method by which the normalized axial flux distribution at the ex-core detectors is used to yield the normalized core average axial power distribution is described in the following.

Let the normalized axial flux distribution at the detectors be designated as $\hat{\phi}_i$ where i designates the axial node at which the flux is defined. Let $S_{ij}$ be the contribution of a unit flux at axial node j at the core periphery to the flux at node i at the detector. OLet $\phi_j$ be the flux at the core periphery in axial node j. Thus, the flux at the detector is given by $$\hat{\phi}_1 = \sum_j S_{ij} \phi_j$$

Representing the fluxes at the detector and periphery as n element column vectors implies that $$\hat{\underline{\phi}} = \underline{\underline{S}}\, \underline{\phi}$$

where
 $\hat{\underline{\phi}}$ is an n element column vector whose typical element is $\hat{\phi}_i$ representing the flux at the detector at node i.
 $\underline{\phi}$ is an n element column vector whose typical element is $\phi_j$ representing the flux at the core periphery at node j.
 $\underline{\underline{S}}$ is an n×n square matrix whose typical element is $S_{ij}$ representing the shape annealing factor for the flux at node i at the detector due to the flux at the periphery at node j.

The flux shape at the periphery is then given by $$\underline{\phi} = \underline{\underline{S}}^{-1}\, \hat{\underline{\phi}}$$

Having determined the peripheral axial flux distribution, it is now necessary to determine the core average axial power distribution $\vec{\phi}_k$ by correcting for control element assembly (CEA) insertion. CEA position indications are used to generate axial CEA shadowing factors.

A planar CEA shadowing factor for a particular planar CEA configuration is defined as the ratio of the peripheral flux at an axial node having that planar CEA configuration to the peripheral flux at an unrodded node, given that the power in the node is the same in both cases.

When the entire node is not uniformly rodded, the planar CEA shadowing factor for that node is given by $$F_i = \sum_k \gamma_k F_k$$

where $\gamma_k$ is the fraction of the node which is rodded with the planar CEA configuration associated with planar CEA shadowing factor $\underline{F}_k$. These factors are conveniently arranged into an n×n diagonal matrix F.

The resultant correction process is mathematically defined as follows:

$$\vec{\phi} = \underline{F}^{-1} \underline{\phi}$$

where:
- $\vec{\phi}$ is an n element column vector whose typical element is $\vec{\phi}_k$ representing the core average axial power distribution at node k.
- $\underline{F}$ is an n×n diagonal matrix whose typical element is $F_{kk}$ representing the CEA shadowing factor associated with a CEA insertion at node k.
- $\underline{\phi}$ is an n element column vector whose typical element is $\phi_j$ representing the flux at the core periphery at node j.

Net Algorithm

The required correction algorithm for converting the ex-core axial flux distribution as synthesized using the ex-core detector responses to the normalized core average axial power distribution is expressed by the following matrix equation:

$$\vec{\phi} = \underline{F}^{-1} \underline{S}^{-1} \hat{\underline{\phi}}$$

Normalized Radial Power Distribution

The radial power distribution that exists at any time for a specified fuel loading pattern, fuel enrichment, and fuel burnup is dependent primarily upon the following:
a. Location and insertion of full and part-length CEA groups;
b. The relative position of individual CEAs within the same CEA group; and
c. Azimuthal Flux tilt magnitude.

The radial power distribution will vary along the core 12 height as a function of the CEA 14 configuration that exists in a given axial segment. The peak value of the normalized radial power distribution in a given axial segment is defined as the one-pin planar radial peaking factor for that segment. The product of the one-pin planar radial peaking factor, core average power and normalized core average axial power distribution in an axial segment defines the power produced in the "hottest" fuel pin 20 in that axial segment.

This product also defines a quantity that is directly proportional to the heat flux in the "hottest" channel 22 in the axial segment. The combination of planar radial peaking factors in axial segments having known CEA 14 configurations, synthesized normalized core average axial power distribution and the measured core average power conservatively defines the axial heat flux distribution and local power density distribution in the "hot" channel 22 and fuel pin 20, respectively, without consideration for azimuthal tilt. The presence of an azimuthal tilt will have the effect of increasing an "untilted" planar radial peaking factor by an amount that is directly proportional to the magnitude of the tilt.

The core protection calculator will monitor the position of every CEA group and receive information from CEA Calculators on the relative position of CEAs 14 in the same group. This information is used to define the CEA 14 configuration along the entire core 12 height. Knowing the total CEA configuration, precalculated planar radial peaking factors are chosen that apply to each axial segment. The radial peaking factors are then modified to reflect an azimuthal tilt magnitude that is at its worst case operating limit. This latter adjustment is made because the azimuthal tilt magnitude is not a directly monitored parameter. The result is a set of axially varying planar radial peaking factors that can be used in defining the "hot" pin and "hot" channel conditions.

Calculation of Planar Radial Peaking Factors

Planar radial peaking factors are used in conjunction with the core average axial power shape to determine the three dimensional peaking factor and the heat flux axial profile. Since the radial peaking depends upon the number and location of control CEAs, planar radial peaking factors depend upon CEA bank insertion and hence upon axial position in the core. The planar radial peaking factors are determined by the Core Protection Calculators (CPCs) for each of 25 axial nodes.

Determination of the pin planar radial peaking factors at any given axial node by the CPC is done by a table look-up routine using a precalculated table of values for the planar radial associated with those CEA groups which have been inserted in normal sequence into the axial node of interest. Penalty factors are then applied to account for the increased radial peaking which would result from conditions other than normal. These include CEA groups being inserted out of sequence, excessive misalignment of subgroups from the group average position, and excessive misalignment of individual CEAs from its average subgroup position.

In the discussion which follows, the term subgroup is defined as being any one of the sets of four CEA combinations which are operated and positioned as a unit. A group is then any combination of one or more subgroups which are operated and positioned as a unit. Regulating CEA groups are considered to be inserted in a prescribed sequence, with group withdrawal in the reverse order. Any insertion of regulating groups in other than this prescribed sequence is considered to be an out-of-sequence condition. In addition to the normal sequential insertion of regulating groups, either or both of the part length rod (PLR) groups or selected subgroups used for reactor power cutback can be inserted at the same time.

$F_{\alpha n}$ is the pin planar radial peaking factor associated with the configuration of CEA groups identified by the $\alpha n$ subscript. Here n represents the number of regulating groups, inserted according to their specific sequence, and $\alpha$ represents the combination of PLR and/or the selected reactor power cutback subgroups inserted in addition to the regulating groups. As an example, if A represents PLR group 1, B represents PLR group 2, and C represents a reactor power cutback subgroup then the group configurations and their associated planar radials can be designated as in the following example:

| CEA Configuration | Subscript Designation, $\alpha n$ | Pin planar radial Peaking factor, $F_{\alpha n}$ |
|---|---|---|
| First 3 regulating groups | 3 | $F_3$ |
| First 2 regulating groups + PLR group 1 | A2 | $F_{A2}$ |
| First 4 regulating groups + cutback group | C4 | $F_{C4}$ |
| PLR group 2 only, no regulating groups | B0 | $F_{B0}$ |
| First regulating group + both PLR groups + cutback group. | ABC1 | $F_{ABC1}$ |

The information available for calculating the planar radials includes the position of a target CEA in each of the 22 subgroups, and CEA deviation information identifying the CEA with maximum deviation from the average position of the CEAs making up the subgroup and the magnitude and direction of the deviation.

The sequence of steps by which the planar radial peaking factors are determined is as follows:

In the first step, target CEA positions and CEA deviations are used as inputs in a calculation where subgroup position is determined. The subgroup position is taken to be the target CEA position, unless the target CEA is the one identified as deviating from the group average. In that case the indicated position is adjusted by the amount of the deviation to give the subgroup position.

Subgroup position is used as input to step two, where the average position of those subgroups making up a group is taken to get the group position. Group position and subgroup position is used as input to step three, where subgroup deviation from group position is obtained.

The group position from step two is also input to step four where pin planar radial peaking factors for normal CEA sequencing are determined. For each of the 25 axial nodes in the core, the group position signals are used to determine which CEA groups have been inserted in their normal sequence into that node. The appropriate pin planar radial peaking factor, $F_{an}$, associated with that CEA configuration is then obtained from a precalculated table of peaking factors.

In the fifth step, the group position information is evaluated at each axial node to determine whether any CEA groups are inserted into a node other than those of which follow the normal sequence of insertion. If an out-of-sequence condition exceeds the allowable limits, an out-of-sequence penalty factor, $P_{os}$, is applied to the planar radial, $F_{an}$, at the nodes affected.

In steps six and seven additional penalty factors, $P_s$ and $P_r$, are applied to account for subgroup or CEA deviations in excess of the allowable limits. Group position is evaluated to identify those nodes at which the group insertion terminates. If subgroup or CEA deviation exceeds the allowable limits, then the appropriate penalty factor is applied at the nodes affected. As might be expected, the penalty factors have different values depending on the direction of the deviation.

The product $F_{an}P_{os}P_sP_r$ emerging from step seven is the nodewise pin planar radial peaking factor, $F_r^p(z)$. The pin planar radial peaking factor is used in the high local power density set point and DNBR calculation. The channel planar radial peaking factor ($F_r^{CHAN}(z)$) is used on the DNBR calculation and is related to the pin planar radial by a proportionality constant. The algorithm is summarized below.

Algorithm For Planar Radial Peaking Factor Calculation

Definitions $D_{rj}$—the maximum deviation of an individual CEA in subgroup j from the subgroup position.

$D_{si}$—the maximum deviation of the subgroup in group i from the group position.

$F_r^p(z)$—the pin planar radial peaking factor at node z.

$F_{an}$—the precalculated pin planar radial peaking factor for the CEA configuration represented by the subscript $an$.

$G_i$—the position of group i.

$F_r^{CHAN}(z)$—the channel planar radial peaking factor at node z.

$P_{os}$—out-of-sequence penalty factor.

$P_{r+}$—CEA deviation penalty factor for positive deviation.

$P_{r-}$—CEA deviation penalty factor for negative deviation.

$P_{s+}$—subgroup deviation penalty factor for positive deviation.

$P_{s-}$—subgroup deviation penalty factor for negative deviation.

$S_{ij}$—position of subgroup j, which belongs to group i.

$T_j$—position of the target CEA for group j.

$\Delta_{os}$—limit on allowed group deviation for out-of-sequence condition.

$\Delta_r$—limit on allowed CEA deviation.

$\Delta_s$—limit on allowed subgroup deviation.

Algorithm

Subgroup positions are found from $$S_{ij} = T_j \text{ for each subgroup } j.$$

If the target CEA is the rod which deviates from the average subgroup position, then for that j $$S_{ij} = T_j - D_{rj}$$

The group position for group i is found from $$G_i = \underset{j \text{ contained in } i}{\text{average over}} \{S_{ij}\}$$

The subgroup deviation for group i is then $$D_{si} = \max_j \{S_{ij} - G_i\}$$

Having obtained the necessary position information, each axial node is evaluated to find:

$$F_r^p(z) = F_{an}P_{os}P_sP_r \text{ node } z$$

$$F_R^{CHAN}(Z) = \text{Constant } F_R^p(Z)$$

Where:

$$P_{os} = \begin{cases} 1.0 \text{ if normal sequence, or if out-of-sequence within allowed limits, } \Delta_{os} \\ P_{os} \text{ if out-of-sequence condition exists within } \Delta_{os} \text{ of node } z. \end{cases}$$

$$P_s = \begin{cases} 1.0 \text{ if } D_{si} \leq \Delta_s \text{ or no groups positioned to node } z. \\ P_{s+} \text{ if } D_{si} > \Delta_s \text{ and } G_i \text{ is within } \pm D_{si} \text{ of node } z \text{ for some } i. \\ P_{s-} \text{ if } D_{si} < -\Delta_s \text{ and } G_i \text{ is within } \pm D_{si} \text{ of node } z \text{ for some } i. \end{cases}$$

$$P_r = \begin{cases} 1.0 \text{ if } D_{rj} \leq \Delta_r \text{ or no groups positioned to node } z. \\ P_{r+} \text{ if } D_{rj} > \Delta_r \text{ and } S_{ij} \text{ is within } \pm D_{rj} \text{ of node } z \text{ for some } j. \\ P_{r-} \text{ if } D_{rj} < -\Delta_r \text{ and } S_{ij} \text{ is within } \pm D_{rj} \text{ of node } z \text{ for some } j. \end{cases}$$

and $F_{an}$ is obtained from the precalculated table of pin planar radial peaking factors for normal sequence group configurations.

Detection and Calculation of Azimuthal Flux Tilt Magnitude

Indications of any azimuthal flux tilting are obtained by comparing the signals from symmetrically located detectors. These signals are fitted to the functional form:

$$\phi(r,\theta) = \phi_o(r,\theta)[1 + sg(r)\cos(\theta - \theta_o)]$$

where the fundamental flux pattern is designated as $\phi_o$, the amplitude of the tilt by s, and the orientation of the tilt by $\phi_o$. The separable functional form in the second term of the equation has been suggested by examination of tilted flux shapes from diffusion theory representations of mild xenon oscillations. The functional $g(r)$, which is given approximately by $J_1(\alpha_1, r)/J_o(\alpha_o, r)$, can be used to relate the tilt signals from different sets of detectors if no asymmetrically placed rods are inserted. Where $J_1$ and $J_o$ are Bessel functions of the first kind of the zero and first orders.

Signals from symmetrically placed in core rhodium detector strings 18 are analyzed to obtain s and $\theta_o$. One symmetrical set such as this gives five values of s and $\theta_o$ since there are five axially located detectors in each string. Since there are five detectors per string, this gives 20 values of the pair (s, $\theta_o$). The average value of s and $\theta_o$ are then found as well as the respective standard deviations. A study of the standard deviations gives some insight into whether or not the average values of s and $\theta_o$ indicate a true flux tilt.

Core Average Power

The core average power is determined by two distinct methods. The first method uses the response of the out-of-core detectors 16. The detectors responses are indicative of the neutron flux level in the core 12; when the ex-core detectors 16 are calibrated to the plant calorimetric, any change in detector response is indicative of a change in neutron flux level which in turn is indicative of a change in the power being produced in the fuel. The second method provides a measure of core power by relating the temperature rise through the core 12 to the total thermal power. The temperature rise through the core is obtained from the temperature detectors (RTD's) in the hot and cold leg coolant piping.

In order to calculate the power level from the neutron flux level signals from the ex-core detectors, corrections for shape annealing, rod shadowing and inlet temperature are necessary. The shape annealing and rod shadowing corrections have been discussed above. The correction for inlet temperature change is necessary because the detector responses are dependent upon the diffusion and absorption of nuetrons that occur between the core periphery and the detector locations.

Reactor coolant from the steam generators 26 passes between the core 12 and detectors 16 before entering the core 12. As a result, the total neutron leakage out of the reactor vessel and thus the ex-core detector response is affected by the reactor coolant, which has temperature dependent neutronic properties. This effect is defined as temperature shadowing and has the characteristic of causing a decrease in detector response for a decrease in inlet temperature. The temperature shadowing effect is independent of the power distribution at the peripheral core assemblies. The corrected detector responses for each detector segment are summed to yield a quantity that is proportional to neutron power level. A constant of proportionality is then applied to convert the detector response to a calibrated thermal power level.

The ex-core detectors 16 respond very rapidly to changes in the neutron flux and, after the above corrections are made, provide a dynamically accurate signal that can be used to sense core power changes. The core power measurement obtained from the temperature rise across the core 12, on the other hand, is a statically accurate indicator of core power. This latter core power measurement, after calibration to the plant calorimetric, provides a very accurate steady-state indication of core power.

The thermal energy added to the coolant as it passes through the core 12 serves as an indicator of core power. This relationship depends upon the fuel, cladding and coolant channel configuration, their heat transfer characteristics and the primary coolant $\Delta T$ rise. The coolant hot leg 28 temperature is measured by sensor 36 and the coolant cold leg 34 temperature is measured by sensor 38. The difference between these two measurements is $\Delta T$. The heat transfer properties of the fuel, clad and coolant are dependent upon the core temperatures and volumetric flow rate of the coolant. Using standard thermodynamic models and methods the core power can be determined by measuring the primary coolant hot 28 and cold 34 leg temperatures. These measurements are used in a mathematical expression which accurately models the core power by taking into account the variation of the heat transfer properties that are temperature dependent. The core volumetric flow rate is obtained from the reactor coolant pump 32 speed measurements.

The $\Delta T$ power measurement described above is also made more accurate for slow variations in core thermal energy by dynamically compensating the basic steady-state expression with a measure of the rate of heat addition to the stored thermal energy in the primary coolant. This is accomplished by differentiating the measured hot and cold leg temperatures, multiplying by constants and adding the products to the steady-state expression.

Since the $\Delta T$ power measurement provides a very accurate steady-state indication of core power, it is used as a calibration standard against which the core power from the ex-core detectors is calibrated during steady-state operation. See U.S. Pat. No. 3,356,577 issued to Ygal Fishman on Dec. 5, 1967. The calibration technique provides an updated nuclear power signal proportional to the time averaged integral error between the calculated nuclear power and $\Delta T$ power. The updating interval is long compared to reactor dynamic characteristics to ensure that the dynamic accuracy of the ex-core detectors is maintained during transients.

In addition to providing a $\Delta T$ power calculation that is accurate for slow transients, the dynamic compensation described above will provide an accurate $\Delta T$ power signal during incidents that involve rapid single CEA deviations (especially a dropped CEA). In the event that a CEA drops, the power distribution will be distorted. This distortion can have the effect that the nuclear power signals in any one or more of the four core protection calculator channels will not be indicative of the core average power. The indicated nuclear power in any channel may be higher or lower than the core average power depending upon how the dropped CEA distorts the power distribution. The $\Delta T$ power, however, will not be significantly affected. Therefore, the nuclear flux power will be used as the core average power indication unless a large CEA deviation is detected, at which time the CPCs will automatically use the $\Delta T$ power as the core average power indication for the low DNBR and high local power density trips.

Calculation of Corrected Neutron Flux Power

In order to calculate the power level as indicated by the neutron flux level measured by the ex-core detectors, corrections for shape annealing and rod shadowing are necessary for each segment of each of the four detector channels. These corrected responses for each detector segment are summed to yield a quantity proportional to the neutron flux power level for each detector channel. A constant of proportionality is then applied to this quantity to convert the detector channel response to a previously calibrated thermal power level.

The shape annealing correction factor is applied to the uncorrected response of each segment of the four ex-core detector strings. Let $D_i$ be the uncorrected response of segment i of a detector string. Let $P_i$ be the detector response of segment i had the detector been placed at the core periphery. In order to determine the external detector segment response, the peripheral segment response must be corrected for the effects of shape annealing. Let $S_{ij}$ be the shape annealing correction factor which allows for contributions to an external detector segment due to the distribution of point sources along the core periphery. This relationship can be conveniently expressed in matrix notation as $$\underline{D} = \underline{\underline{S}}\, \underline{P}$$

where
- $\underline{D}$ is an n element column vector representing the external detector segment responses whose typical element is $D_i$
- $\underline{\underline{S}}$ is an n×n element matrix representing the shape annealing factors whose typical element is $S_{ij}$
- $\underline{P}$ is an n element column vector representing the peripheral detector segment responses whose typical element is $P_i$.

In order to determine the peripheral detector response, the following calculation is required:

$$\underline{P} = \underline{\underline{S}}^{-1}\, \underline{D}$$

Having determined the detector response had the detectors been at the core periphery, it is now necessary to determine the detector response in the absence of flux perturbations due to CEA insertion in the region of the detector. Average CEA shadowing factors $\overline{R}$ are determined for each detector segment dependent on CEA insertion in the region of detector segment. This can mathematically be expressed as:

$$R_j = \sum_{i=1}^{N} X_i F_i$$

where
- $R_j$ = Average CEA shadowing correction factor for detector segment j
- $X_i$ = Fraction of the overall segment length to which CEA shadowing factor $F_i$ applies
- $F_i$ = Planar CEA shadowing factor for a given CEA insertion
- $N$ = Number of different shadowing regions over a detector segment.

The $X_i$ are determined by CEA position indications. The average CEA shadowing correction factor for each segment is applied to the peripheral detector response to yield a detector signal $\phi_i$ for segment i proportional to nuclear power.

$$\underline{\phi} = \underline{\underline{R}}^{-1}\, \underline{P}$$

where
- $\underline{\phi}$ is an n element column vector representing a quantity proportional to nuclear power whose typical element is $\phi_i$
- $\underline{\underline{R}}$ is an n×n diagonal matrix of average CEA shadowing factors whose typical element is $R_{ii}$
- $\underline{P}$ is an n element column vector representing the peripheral detector response whose typical element is $P_i$.

The individual segments i of each string are then summed.

$$\phi = \sum_{i=1}^{m} \phi_i$$

where
- $\phi$ = Total corrected detector channel response proportional to reactor power
- $\phi_i$ = Corrected response of segment i The total summed response $\phi$ is corrected for temperature changes by applying a factor that is proportional to the change in cold leg temperature. Let $T_f$ be the temperature correction factor then $$\phi_N(t) = \phi(t) \cdot T_f(t)$$

where $$T_f(t) = 1 + C_T(T_{co} - T_{cmin}(t))$$

- $T_{cmin}$: is the minimum of the two cold leg temperature signals
- $C_T$: is a proportionality constant relating the percent change in indicated neutron flux power for a one degree temperature change
- $T_{co}$: is a base cold leg temperature which is set at the limit of the usable sensor range.

This number is proportional to the nuclear flux power as measured by that detector channel. The constant of proportionality is determined during power range testing by calibrating the detector response to a known steady state thermal power level. The final calculation required for determining the calibrated neutron flux power is to correct the total average corrected detector response by the calibration factor $K_{cal}$.

$$\phi_{cal} = K_{cal}\, \phi_N$$

where:
- $\phi_{cal}$ = Calibrated neutron flux power for the channel
- $K_{cal}$ = Calibration factor for detector response to power
- $\phi_N$ = Total corrected detector channel response for the channel.

The calibration factor is obtained on-line by making use of the calculated $\Delta T$ power. The algorithms employed to perform this calibration are described infra.

Calculation of Core Thermal Power ($\Delta T$ Power)

The calculated core thermal power is obtained using a correlation based on measured coolant conditions. The information available as input to this calculation consists of hot and cold leg temperature signals, the reactor coolant system mass flow rate and an indication of the number of reactor coolant pumps running.

The ΔT power is calculated in two portions, a static calculation and a dynamic calculation.

Static Calculation:

The two hot and cold leg temperature inputs are averaged and used in the following equation:

$$B^{static}_{\Delta T} = f_1(\dot{m}) \Delta T + f_2(\dot{m}) \Delta T \cdot \overline{T}_c + f_3(\dot{m}) \Delta T^2$$

where $B^{static}_{\Delta T}$: core power expressed in percent of rated power $\Delta T$: defined as $\overline{T}_h - \overline{T}_c$ $\overline{T}_h$: defined as $\dfrac{T_{h1} + T_{h2}}{2} =$ $\overline{T}_c$: defined as $\dfrac{T_{c1} + T_{c2}}{2}$ $T_h$: hot leg temperature
$T_c$: cold leg temperature
$f_i(\dot{m})$: are fitted coefficients that are a function of coolant mass flow rate and are of the general form:
$f_i(\dot{m}) = a_i \dot{m} + b_i \dot{m}^2 + c_i$ with $a_i$, $b_i$, $c_i$ being constants.

The static ΔT power equation conservatively calculated the variation in-core power with temperature changes, mass flow rate and coolant specific heat (which is temperature dependent).

Dynamic Calculation

The hot and cold leg temperature signals used in the static calculation are obtained from Resistance Temperature Detectors (RTDs) in the primary coolant piping. As a result of their location the hot leg temperature signal will "lag" the core outlet temperature due to the transport time involved through the coolant piping; similarly the cold leg temperature signal will "lead" the core inlet temperature. Dynamic compensation is provided to accommodate this effect as follows:

$$B^{dyn}_{\Delta T} = \tau \cdot \frac{dT_x}{dt} \cdot f_4(\dot{m})$$

where $T_x$: is a weighted average of the hot and cold leg temperature signals, defined as $$T_x = W_1 \overline{T}_h + W_2 \overline{T}_c$$

with $W_1$ and $W_2$ being weighting coefficients.
$f_4(\dot{m})$: is a flow dependent coefficient as described above.

$\tau \dfrac{dT_x}{dt}$: is a "filtered" derivative of $T_x$ which in Laplace transform notation is $$\frac{\tau s}{\tau_l s + 1}$$

where $\tau_l$ is an equivalent coolant transport lag time constant and $\tau$ is a derivative gain which accounts for coolant transport delays and sensor time constants.

Dynamic Compensation assures that the ΔT power agrees with the heat flux transmitted out of the fuel pin.

The dynamic portion of the ΔT power is implemented using a Z transform of the above equation as $$B^{dyn}_{\Delta T}(t) = \frac{f_4(\dot{m})}{(\tau_l + \Delta S)} [\tau_l B^{dyn}_{\Delta T}(t - \Delta S) + \tau (T_x(t) - T_x(t - \Delta S))]$$

where:
ΔS: is the time between updates of $B_{\Delta T}{}^{dyn}$
The total ΔT power is then $$B = B^{static}_{\Delta T} + B^{dyn}_{\Delta T}$$

The calculated ΔT power is used to calibrate the nuclear flux power, as described hereinafter.

Calculations for Calibration of Neutron Flux Power to ΔT Power

The calculated ΔT Power, described supra, is used to calibrate the corrected neutron flux power. The calibration algorithm is specified to provide an accurate calibration during steady-state operation but retain the rapid neutron flux power response during anticipated operational occurrences. The flux power calibration is achieved by means of a proportionality constant multiplier ($K_{cal}$) on the corrected neutron flux power. The calibrated neutron flux is defined by $$\phi_{cal} = K_{cal} \times \phi_N$$

where
$\phi_{cal}$: calibrated neutron flux power
$K_{cal}$: calibration factor
$\phi_N$: total corrected detector response
The calibration factor is defined by the following equation:

$$K_{cal}(t) = K_{cal}(t - \Delta S) + \tau_k [\phi_{cal}(t) - B(t)] \Delta S$$

with $$\phi_{cal}(t) = K_{cal}(t - \Delta S) \cdot \phi_N(t)$$

where:
$K_{cal}(t - \Delta S)$: is the calibration factor that was calculated at the previous sampling time
ΔS: is the time internal between $K_{cal}$ updates
$\tau_k$: is an error weighting factor which is less than unity
B: ΔT power The error weighting factor is chosen to result in an effective neutron flux power calibration time constant of approximately 4 minutes. The means that if there were a step change in ΔT power is would take about 16 minutes for the difference between neutron flux power and ΔT power to be reduced to 2 percent of its initial value.

The above technique is used for calibration during conditions when there is no excessive CEA deviation. In the event that excessive CEA deviation occurs the neutron flux power indication can rapidly decalibrate. The flux power calibration algorithm consists of logic which will change the mode operation of calibrated neutron flux power as the power input to the DNBR and local power density set point calculation. This mode will occur for those CEA configurations which are not accommodated by the CEA shadowing correction. In this mode, the ΔT power is the primary power input. The ΔT power conservatively predicts the core average power for these conditions.

Method Used to Determine Reactor Coolant System Mass Flow Rate

The primary coolant mass flow rate is used in the low DNBR trip. The mass flow rate is obtained using the pump speed inputs from the reactor coolant pumps 32, the primary coolant pressure, and the core inlet temperature. The volumetric flow rate through each reactor coolant pump is dependent upon the rotational speed of the pump and the pump head. This relationship is typically shown in pump characteristic curves. Flow changes resulting from changes in the loop flow resistances occur slowly (i.e., core crud buildup, increase in steam generator resistance, etc.). Calibration of the pump speed signal, relating pump rotational speed to volumetric flow, will be performed periodically using pump ΔP instrumentation which is not part of this invention.

Flow reductions associated with pump speed reductions are more rapid than those produced from loop flow resistance changes. The pump rotational speed signal is converted to a pump volumetric flow using mathematical relationships based on pump characteristics and periodic loop flow calibrations. The algorithm used is conservative relative to the actual pump performance.

The volumetric flow rates calculated for each pump 32 are summed to give a vessel flow. The vessel flow is corrected for core bypass and density and the result is the core mass flow rate.

Calculation of Reactor Coolant System Mass Flow Rate

The reactor coolant system mass flow rate is obtained from the rotational speed of each reactor coolant pump 32. This is done by making use of the pump characteristic curves, summing the four pump volumetric flow rates, correcting for internal and external vessel flow leakage and correcting for density variations.

Proximity probes are used to measure the shaft rotational speed. The volumetric flow rate for each pump is defined by the general relationship shown below:

$$V_i = F_i(RPM, \Delta P(RPM,N), N)$$

where:
$V_i$ = volumetric flow rate of pump i
RPM = pump shaft rotational speed
ΔP = pump head (obtained for periodic calibration)
N = number of coolant pumps running The total vessel volumetric flow rate is the sum of the pump flows. The summed flows are adjusted for core bypass as follows:

$$V_{core} = K_{bypass} \cdot \left[ \sum_{i=1}^{N} V_i \right]$$

where:
$V_{core}$: volumetric flow rate through the core
$K_{bypass}$: flow bypass correction factor The core volumetric flow rate is corrected for density to obtain the mass flow rate as follows:

$$\dot{M} = V_{core} \, C_0 + C_1(T_c - T_{co}) + C_2(P - P_o))$$

where:
$\dot{m}$: is the mass flow rate
$C_0$: is the density correction at base inlet temperature ($T_{co}$) and pressure ($P_o$)
$C_1$ and $C_2$: are coefficients that reflect the density change from the base conditions
$T_c$: is the maximum of the two cold leg temperature inputs
$P$: is the measured pressurizer pressure

Method Used to Determine Local Power Density Trip Set Point

The local power density distribution in the fuel is dependent upon the core power distribution. The objective of establishing a trip on high local power density is to prevent the centerline fuel temperature in the "hottest" fuel pellet in the core from exceeding the melting point. The centerline fuel temperature is dependent upon the pellet geometry, pellet composition, the amount of energy deposited in the fuel, the local power density, the gap and cladding configuration and their heat transfer characteristics.

The core power distribution can be related to the local power density deposited in the fuel by a proportionality constant. The power distribution in the "hot" pin can be obtained by the methods described supra.

In the steady-state, the deposited local power density can be related to the centerline fuel temperature by a proportionality constant when the temperature profile across the fuel diameter is known. Therefore, the centerline fuel temperature can be directly related to the power distribution in the "hot" fuel pin.

During transient conditions, the deposited local power density can be related to the centerline fuel temperature through standard heat conduction models which predict the spatial variation in the fuel temperature profile as a function of the heat transfer time constant of the fuel. Therefore, changes in centerline fuel temperature can be directly related to changes in the power distribution in the "hot" pin.

The local power density trip set point is defined as that value of core average power which corresponds to a power density in a fuel pellet which would result in raising the steady-state centerline fuel temperature to the melting point for a given three-dimensional peaking factor. The three-dimensional peaking factor is defined as the maximum product of the normalized core average axial power distribution and axially varying planar radial peaking factor adjusted for allowed azimuthal tilt magnitude. This definition of the set point assures that the local power density in the "hottest" fuel pellet is accommodated and that the dynamics of the fuel temperature variation are correctly defined.

The basic operation of the high local power density trip is as follows:
 a. a power trip set point is calculated as described above;
 b. the indicated core average power is compared to the set point;
 c. a trip will occur if the core average power remains equal to the set point for a fixed time interval.

If the core average power becomes greater than the set point a trip will occur in a time interval that is a function of the amount by which the core average power exceeds the set point and the transient characteristics of the set point. The time interval that occurs before a trip signal is generated is obtained by delaying the setpoint transient response to account for the fuel temperature time constant and accelerating the set point transient response to account for protective system time delays, CEDM de-energization time and the time required to effectively terminate the occurrence.

Calculation of Local Power Density Set Point

The local power density set point is that value of the core power which could correspond to the limiting local power density for a given three-dimensional peaking factor and azimuthal tilt magnitude.

The information available for calculating the set point consists of the planar radial peaking factors, ($F_r^p(z)$), the normalized core average axial power shape, ($F_z(z)$), and the azimuthal tilt magnitude ($T_r$).

The maximum value of the product $F_z(z)F_r^p(z)$ is the 3-D peaking factor, which is defined as the ratio of the peak local power density to the core average power density. Thus, if $C_S$ represents the limiting local power density divided by the full power average local power density, the ratio of $C_s$ to $F_z(z)F_r^p$ expressed as a percentage gives the core power at which this limit will be reached. Reducing this by the amount of azimuthal tilt results in the static local power density set point, $B_{sp}^{st}$, which is the value of core average power that would result in centerline fuel melt in steady-state. This set point is passed through the digital equivalent of a lead-lag filter of the form:

$$\frac{\tau_1 s + 1}{\tau_2 s + 1}.$$

The output of the filtered set point is the local power density trip set point, $B_{sp}$. The algorithm is summarized below.

Algorithms for Local Power Density Set Point Calculation

Definitions
$B_{sp}^{st}$—local power density static set point
$B_{sp}$—local power density trip set point
$C_s$—a constant based on the allowed limiting value of the local power density
$F_r^p(z)$—the pin planar radial peaking factor at node z
$F_z(z)$—the normalized core average axial power distribution, expressed as the ratio of the power at axial node z to the average power
$T_r$—the azimuthal tilt magnitude
$\Delta S$—time between static set point samples
$\tau_1$—protective system equivalent delay time
$\tau_2$—fuel, gap and clad effective time constant
Algorithm
The local power density static set point is found from:

$$B_{sp}^{st} = \frac{C_s}{\max F_z(z)F_r^p(z)(1 + T_r)}$$

where
max $F_z(z)F_r^p(z)$ is the maximum value of the product evaluated at each node z.
The trip set point is found using a z-transform of the lead-lag filter as follows:

$$B_{sp}(t) = \frac{1}{(\tau_2 + \Delta S)}[\tau_2 B_{sp}(t - \Delta S) +$$

-continued
$$(\tau_1 + \Delta S) B_{sp}^{st}(t) - \tau_1 B_{sp}^{st}(t - \Delta S)]$$

High Local Power Density Trip Signal Generation

The local power density trip set point that is calculated as described above is compared to the measured core average power. The core average power measurement is either the corrected neutron flux power or the calculated $\Delta T$ power depending upon the conditions discussed above. Based upon this comparison the following actions are initiated:

a. if: $M_2 < B_{sp} - \phi_{cal} \leq M_1$
a contact opening output is sent to the Reactor Protective System 2/4 CEA withdrawal prohibit logic.

b. if: $0.0 < B_{sp} - \phi_{cal} \leq M_2$
a contact opening output provides a channel pre-trip annunciation and a contact closure output provides a signal to the 2/4 Power Reduction Control Signal logic.

c. if: $B_{sp} - \phi_{cal} \leq 0.0$
a contact opening output provides a channel trip signal to the 2/4 RPS trip logic.

The values of M1 and M2 are margins to trip expressed in terms of percent of core power, with M1 > M2.

Method Used to Determine DNBR

The Core Protection Calculators require a correlation for calculation of on-line minimum DNBR. Input to the calculation will include the instant reactor conditions of mass flow, integrated nuclear planar radial peaking factor, the ratio of maximum average fuel assembly power to core average assembly power, coolant inlet temperature, a measure of the axial power distribution, and reactor coolant system pressure. A simplified closed channel hydraulic model is used as the algorithm for the on-line computation of DNBR. This on-line computation may most easily be done in a special purpose digital computer. Since the closed hot channel calculation does not take into consideration turbulent interchange of coolant between the hot channel and the neighboring channels, an adjustment to the algorithm's input is required. This adjustment is made to the mass velocity in the channel such that when all other conditions are the same, the closed channel minimum DNBR equals the minimum DNBR obtained by considering the interchange of coolant between channels. The adjusted mass velocity is found by evaluating an analytically derived Equivalent Mass Velocity Correlation.

The Equivalent Mass Velocity Correlation is an expression of the form:

$$Ge = Go + \sum_{i=1}^{N}(A_i \Delta \psi_1 + B_i (\Delta \psi_i)^2)$$

where
Ge = algorithm required mass velocity;
Go = channel mass velocity at nominal reactor condition;
$A_i$, $B_i$ = analytically determined form coefficients for ith parameter;
$\Delta \Psi_i$ = change of ith parameter from its nominal value.
The coefficients of the polynominal fit are analytically determined by the following scheme.

a. Input parameters are varied individually in many calculations performed off-line with detailed thermal hydraulic design codes.
b. The same input is used in the on-line version of the model with the exception that mass velocity is iterated upon such that the DNBR obtained from the off-line codes is matched.
c. Knowing the input variations from one case to the next and the required mass velocity for prediction of the minimum DNBR, the coefficients of the mass velocity correlation can be determined via multiple regression calculations. However, the minimum DNBRs produced here must equal or exceed those which result from the on-line calculations.

The Equivalent Mass Velocity Correlation is dependent upon all the input parameters mentioned above. The integrated planar radial peaking factor is defined as the integrated value of the product of the axial dependent planar radial peaking factors and the normalized core average axial power distribution. The ratio of the maximum assembly power to the core average assembly power is related to the integrated planar radial peaking factor by a proportionality constant.

The DNB trip is basically composed of two distinct levels of calculation. The first level can be termed as the periodic static or snapshot calculation and the second level as the update calculation. In the periodic calculation, the most recent values of the monitored variables or calculated parameters that affect the DNBR are used to determine the DNBR. This calculation employs the Equivalent Mass Velocity Correlation discussed above and a simplified version of the W-3 correlation. The update calculation will be used to update the DNBR between periodic calculations. The relationships involved consist of polynominal functions that have been obtained from extensive analysis using a standard DNBR analysis method.

Calculations for Minimum DNBR

The minimum DNBR in the "hot" channel is calculated using the following calculated parameters and monitored NSSS variables:
a. calculated normalized core average axial power distribution,
b. calculated axially dependent one-pin and coolant channel planar radial peaking factors,
c. calculated reactor coolant mass flow rate,
d. calibrated neutron flux power,
e. maximum of the two input cold leg temperatures, and
f. the monitored reactor coolant system pressure.

Periodic DNBR Calculation

The periodic calculation uses the inputs listed above, in the Equivalent Mass Velocity Correlation and simplified version of the W-3 correlation.

The equivalent mass velocity is defined by $$Ge = g^* + c_1 [\dot{m} - 100] + c_2 [\dot{m} - 100]^2 +$$
$$c_3 \left[ \frac{P_{box}}{P_{core}} - 1.45 \right]^3 + c_4 \left[ \frac{P_{box}}{P_{core}} - 1.45 \right]^2 +$$
$$c_5 \left[ \frac{P_{box}}{P_{core}} - 1.45 \right] + c_6 [P_{pri} - 2250] +$$
$$c_7 [P_{pri} - 2250]^2 + c_8 [\phi_{cal} - 100] + c_9 [\phi_{cal} - 100]^2 +$$

-continued
$$c_{10} [T_{cmax} - 558.3] + c_{11} [T_{cmax} - 558.3]^2$$

where:
$g^*$: is the channel mass velocity at a datum (for instance nominal reactor conditions)
$\dot{m}$: is the calculated coolant mass flow rate in percent of 4 pump design flow $\frac{P_{box}}{P_{core}}$ : is the fuel assembly peaking factor defined by $$\frac{P_{box}}{P_{core}} = a_1 F_r^{int}$$

$F_r^{int}$: is the integrated planar radial peaking factor defined by $$F_r^{int} = \int_0^{\text{active core length}} F_z(z) F_r^p(z) dz$$

$F_z(z)$: is the normalized core average axial power distribution
$F_r^p(z)$: is the axially dependent planar radial peaking factor
$P_{pri}$: is the pressurizer pressure
$\phi_{cal}$: is the calibrated neutron flux power
$T_{cmax}$: is the maximum of the two cold leg temperature inputs
$C_i$'s and $a_1$: are constants Knowing the equivalent mass velocity and the axial distribution at 25 axial nodes, the coolant enthalpy rise can be calculated up the channel from $$H_i = H \bigg|_{z=0} (T_{cmax}, P_{pri}) + \frac{\Delta H_i}{2} (\phi_{cal}, Ge, T_r, F_{ri}^{chan}, F_{zi})$$

where:
$H_i$: average coolant enthalpy at node i
$H|_{z=0}$: coolant enthalpy at core inlet
$\Delta H_i$: coolant enthalpy rise at node i
$F_{ri}^{chan}$: channel planar radial peaking factor at node i, defined by $$F_{ri}^{chan} = \text{constant} \times F_{ri}^p$$

$T_r$: azimuthal tilt magnitude

With the coolant enthalpy known at each node, the critical heat flux is calculated $$Qcrit_i = f_1(\phi_{cal}, Ge, H_i, T_{cmax}, P_{pri}, F_{ri}\text{chan}, F_{zi})$$

The complicated expressions for $Qcrit_i$ involving several empirically derived constants utilizes the standard W-3 correlation developed by Tong and may be found in: L. S. Tong, "Prediction of Departure from Nucleate Boiling for an Axially Non-uniform Heat Flux Distribution," *Journal of Nuclear Energy*, 21:241–248, 1967.

The local heat flux at each node defined by $$Qlocal_i = f_2(\phi_{cal}, T_r, F_r^p, F_{zi})$$

is divided into the critical heat flux to give the DNBR at each node, $$DNBR_i^{periodic} = Qcrit_i / Qlocal_i$$

The minimum DNBR resulting from the periodic portion of the calculation is then $$DNBR^{periodic} = min[DNBR_i^{periodic}]$$

DNBR Update Calculation

The periodic calculation described above will be performed approximately every 2 seconds. In this time interval the update calculation is used to update the statically calculated DNBR. In this context, when "continuously" is used in the description and in the claims it should be taken to mean: "of a substantially higher periodicity than the frequency of the periodic calculation."

The local heat flux defined as $$Qlocal_i = constant \cdot \phi cal \cdot F_{zi} \cdot F_{ri} P \cdot (1 + T_r)$$

is calculated on a nodal basis. The update calculation is performed approximately every 20 millisec. Therefore, the periodic calculation will never have an input that is more than 20 millisec delayed.

The periodic DNBR is updated within the interval between periodic calculations by comparing the inputs to the values of the inputs used in the most recently completed periodic calculation. The differences in the input values are used to calculate the change in the periodic DNBR at each node by a partial derivative approached as shown below $$\Delta DNBR_i(t) = \frac{\partial DNBR}{\partial Qlocal}[Qlocal_i(t) - Qlocal_i^{periodic}] + \frac{\partial DNBR}{\partial T_{cmax}}[T_{cmax}(t) - T_{cmax}^{periodic}] + \frac{\partial DNBR}{\partial \dot{m}}[\dot{m}(t) - \dot{m}^{periodic}] + \frac{\partial DNBR}{\partial P_{pri}}[P_{pri}(t) - P_{pri}^{periodic}]$$

where:

$\Delta DNBR_i(t)$: is the change in DNBR at node i $\frac{\partial DNBR}{\partial Qlocal}$, $\frac{\partial DNBR}{\partial T_{cmax}}$, etc.: are functions that relate a change in a particular parameter to an equivalent change in DNBR. These functions will be conservatively chosen constants or polynomial expressions that depend upon the measured values of other pertinent parameters.

$Qlocal_i(t)$: is the heat flux at node i $T_{cmax}(t)$: is the inlet temperature $Qlocal_i^{periodic}$: is the value of the heat flux at node i used in the periodic DNBR calculation $T_{cmax}^{periodic}$: is the value of the inlet temperature used in the periodic DNBR calculation $\dot{m}(t)$: is the current calculated value of the reactor coolant mass flow rate $\dot{m}^{periodic}$: is the mass flow rate used in the periodic DNBR calculation $P_{pri}(t)$: is the current sampled value of the primary coolant pressure $P_{pri}^{periodic}$: is the value of the primary pressure used in the periodic DNBR calculation The updated DNBR at each node is then $$DNBR_i(t) = DNBR_i^{periodic} + \Delta DNBR_i(t)$$

The minimum DNBR is then $$DNBR(t) = min[DNBR_i(t)]$$

It will be understood that the embodiment shown and described herein is merely illustrative and that changes may be made without departing from the scope of the invention as claimed.

What is claimed is:

1. An improved Nuclear Power System fuel damage protection apparatus for the prevention of the violation of a fuel design limit, said apparatus being of the type which utilizes an index which is representative of the proximity of the violation of said design limit, said index being mathematically represented by an equation which defines the functional relationship between said index and a multiplicity of system parameters, said apparatus including means for continuously generating a multiplicity of electrical signals which each vary as a function of one of said multiplicity of system parameters and means responsive to said multiplicity of electrical signals for periodically sampling said signals and for periodically generating an electrical signal commensurate with said index of said system at the time of said sampling, the improvement comprising:

a. means responsive to said sampled parametric signals and to said continuously generated parametric signals for continuously generating an index update electrical signal commensurate with the change of index which occurs after said sampling;

b. means responsive to said signal commensurate with the index of said system at the time of said sampling and to said index update signal for summing said signal to continuously generate an electrical signal commensurate with an up-to-date value of the index of said systems; and c. means responsive to the signal commensurate with the up-to-date value of the index for correctively regulating said Nuclear Power System when the value of the index indicates a design limit violation.

2. The apparatus of claim 1 wherein said means responsive to said sampled parametric signals and to said continuously generated parametric signals for continuously generating an index update signal, includes:

(1) comparison means responsive to said sampled parametric signals and to said continuously generated parametric signals for continuously generating signals commensurate with the change between said sampled parametric signals and said continuously generated parametric signals of the same parameter; and (2) means responsive to said signals commensurate with said change between said sampled parametric signals and said continuously generated parametric signals of element (1) for generating an electrical signal commensurate with the sum of changes in said index due to changes in said continuously generated parametric signals.

3. The apparatus of claim 1 further comprising:
f. means responsive to one of said continuously generated electrical parametric signals for generating an electrical signal commensurate with a projection of said index due to the projected change of said one parametric signal over a projected time period (T).

4. The apparatus of claim 3 wherein said index is a departure from nucleate boiling ratio (DNBR) and said apparatus further comprising:
g. means for selecting the smaller of said signal commensurate with the up-to-date DNBR of said system and said signal commensurate with said projection of DNBR;
h. means for generating a trip set point electrical signal commensurate with the minimum allowable value of DNBR; and
i. means responsive to said smaller DNBR signal of element (g) and said DNBR set point for comparing said smaller DNBR signal and said DNBR set point signal.

5. The apparatus of claim 3 wherein said means for generating an electrical signal commensurate with a projection of index comprises:
(1) means responsive to said one parametric signal for generating a signal commensurate with a projected change of index due to the projected change of said one parametric signal over a projected time period (T); and
(2) means for summing said signal commensurate with a projected change of index and said continuously generated index signal commensurate with said up-to-date index of said system for generating an electrical signal commensurate with a projected index due to the change of said one parametric signal over a projected time period (T).

6. The apparatus of claim 5 wherein said means for generating an electrical signal commensurate with a projected change of index due to the projected change of said one parametric signal over a projected time period (T) comprises:
a. means responsive to said one parametric signal for continuously generating an electrical signal commensurate with the derivative of said one parametric signal with respect to time;
b. means responsive to said signal commensurate with the derivative of said one parametric signal with respect to time for generating an electrical signal commensurate with the product of said derivative signal and a value commensurate with the partial derivative of said index with respect to said reactor parameter represented by said one parametric signal, said generated signal is a signal commensurate with the derivative of said index with respect to time;
c. means responsive to said signal of element (b) (the derivative of index with respect to time) for generating an electrical signal commensurate with the product of said signal of element (b) and a value commensurate with a time period (T), said product signal is a signal commensurate with a projected change of index over a projected time period (T) due to a projected change in said one parametric signal.

7. The apparatus of claim 6 wherein said system includes a nuclear reactor with a core which is cooled by a coolant circulating there through and which is controlled by the insertion of control rods, and said one parametric signal is a signal commensurate with said reactor's parameter of coolant system flow rate, and wherein said time period (T) is a function of said reactor's parameter of axial power distribution, said apparatus further comprising:
d. means responsive to said parametric signal commensurate with axial power distribution for generating an electrical signal commensurate with a time period (T) as a function of axial power distribution.

8. The apparatus as recited in claim 1 wherein said index is departure from nucleate boiling ratio (DNBR) and said apparatus further includes:
f. means responsive to one of said parametric signals commensurate with a Nuclear Power System parameter for generating an electrical signal commensurate with a change in DNBR due to the change of said one parameter with respect to the long term average value of said parameter, said average value constrained to be equal to or less limiting on DNBR than the continuously generated value of said parameter;
g. means for generating an electrical signal commensurate with a preselected value of DNBR which is higher by a predetermined margin than the minimum allowable value of DNBR for which a critical heat flux is exceeded;
h. means responsive to said signals of elements (f) and (g) for summing said signals to generate a signal commensurate with an updated DNBR margin;
i. means responsive to said updated DNBR margin signal of element (h) and to said signal commensurate with an up-to-date value of DNBR of said system of element (e) for selecting the larger of the two signals of elements (h) and (e);
j. means responsive to said one parametric signal for generating an electrical signal commensurate with a projected change of DNBR due to the projected change of said parametric signal over a projected time period (T), said projected change being limited to negative values; and
k. means responsive to said larger signal of element (i) and to said signal commensurate with a projected change of DNBR due to the projected change of said parametric signal over a projected time period (T) of element (j) for summing said signals of elements (j) and (i).

9. The apparatus recited in claim 8 further comprising:
(1) means for generating a trip setpoint electrical signal commensurate with the minimum allowable DNBR value; and
m. means responsive to said summed signal of element (k) and to said trip setpoint signal of element (1) for comparing said signals.

10. The apparatus as recited in claim 8 wherein said means for generating an electrical signal commensurate with a change in DNBR due to the change of said parameter with respect to the long term average value of said parameter includes;
(1) means responsive to said one parametric signal for continuously generating an electrical signal commensurate with the average value of said one parametric signal over a preselected finite period of time, said average value constrained to be equal to or less limiting on DNBR than the continuously generated value of said parameter;

(2) means for continuously subtracting said signal commensurate with the average value of said one parametric signal of element (1) from the continuously generated value of said one parametric signal to generate an electrical signal commensurate with the most recent deviation of said parameter from its average value taken over a finite period of time;

(3) means for multiplying said signal commensurate with the most recent deviation of said one parameter from its average value of element (2) by a signal commensurate with the partial derivative of DNBR with respect to the parameter of said one parametric signal to generate a signal commensurate with the change in DNBR due to the change of said one parameter.

11. A method for preventing the violation of a Nuclear Steam Supply System design limit said system having a nuclear reactor with a core and having fuel pins and channels therein through which a coolant is circulated, said method comprising the steps of;

a. continuously generating a multiplicity of electrical parametric signals which are commensurate with a multiplicity of Nuclear Steam Supply System parameters, said parameters including the parameters used in calculating the DNBR of said reactor core;

b. periodically sampling said parametric signals;

c. generating from said periodic samples of said parametric signals a periodic DNBR electrical signal commensurate with the DNBR of said reactor core at the time of said sampling;

d. continuously comparing one of said continuously generated parametric signals to the periodically sampled signal of the same parameter used to generate the next previous periodic DNBR signal;

e. generating an electrical signal commensurate with the change in DNBR due to the change in said parameter;

f. continuously generating an updated DNBR signal responsive to the electrical signal commensurate with the periodic DNBR of said reactor core at the time of said sampling and said electrical signal commensurate with the net change in DNBR due to the change in said parameter to continuously generate an electrical signal commensurate with the actual DNBR of said reactor core; and g. correctively regulating said Nuclear System when the continuously generated DNBR signal indicates a design limit violation.

12. The method of claim 11 further including the steps of:

g. generating an electrical signal commensurate with a projection of DNBR due to a projection of one of said continuously generated electrical parametric signals over a projected time period (T);

h. generating a DNBR trip set point electrical signal commensurate with the minimum allowable DNBR value;

i. comparing said signal commensurate with the projected DNBR of said reactor core and said signal commensurate with the minimum allowable DNBR value; and j. correctively regulating said reactor when said signal commensurate with said projected DNBR equals or falls below said signal commensurate with the minimum allowable DNBR value.

13. An improved Nuclear Power System Protection Apparatus for the prevention of the violation of a nuclear power system design limit the proximity to which is indicated by an index, the improvement comprising:

a. means for determining a time derivative of said index or a component part thereof;

b. means responsive to said time derivative for multiplying said time derivative by a positive time period (T) to generate an electrical signal commensurate with a projection of said index into the future over said time period (T); and c. means responsive to said electrical signal commensurate with a projection of said index for correctively regulating said nuclear power system.

14. An improved Nuclear Power System fuel damage protection apparatus as recited in claim 13 for the prevention of the violation of a fuel design limit, said apparatus being of the type which utilizes an index which is representative of the proximity of the violation of said design limit, said index being mathematically represented by an equation which defines the functional relationship between said index and a multiplicity of system parameters, said apparatus including means for continuously generating a multiplicity of electrical signals which each vary as a function of one of said multiplicity of system parameters and means responsive to said multiplicity of electrical signals for generating an electrical signal commensurate with said index, the improvement comprising:

a. means responsive to one of said continuously generated electrical parametric signals for generating an electrical signal commensurate with a projection of said index due to the projected change of said one electrical parametric signal over a projected time period (T).

15. The improved fuel damage protection apparatus as recited in claim 14 wherein said means for correctively regulating said Nuclear Power System includes:

a. means for generating a trip setpoint electrical signal commensurate with a limiting value of said index; and b. means responsive to said electrical signal commensurate with a projection of said index due to the projected change of said one parametric signal over the projected time period (T) and responsive to said trip setpoint electrical signal for tripping said Nuclear Power System when said projection of said index reaches said trip setpoint.

16. Said improved fuel damage protection apparatus as recited in claim 14 wherein said index is the Departure From Nucleate Boiling Ratio.

17. Said improved fuel damage protection apparatus as recited in claim 14 wherein said index is the Departure From Nucleate Boiling Ratio (DNBR).

18. The improved fuel damage protection apparatus as recited in claim 17 wherein said time period (T) includes the reaction time of said fuel damage protection apparatus.

19. The improved fuel damage protection apparatus as recited in claim 14 wherein said time period (T) includes the reaction time of said fuel damage protection apparatus.

20. An improved method for the protection against violation of a nuclear power system design limit the proximity to which is indicated by an index, the improvement comprising:

a. determining a time derivative of said index or a component part thereof;

b. multiplying said time derivative by a positive time period (T) to generate an electrical signal commensurate with a projection of said index into the future over said time period (T); and c. correctively regulating said nuclear power system in response to said electrical signal commensurate with a projection of said index.

21. An improved method as recited in claim 20 for the protection against the violation of a Nuclear Power System design limit the proximity to which is indicated by an index, said index being calculated from a multiplicity of system parameters by a mathematical equation which defines the functional relationship between said index and said multiplicity of system parameters the improvement comprising the steps of:

a. generating an electrical signal commensurate with a projection of said index due to the projected change of one of said parametric signals over a projected time period (T).

22. The improved method of claim 21 wherein said Nuclear Power System has a nuclear reactor with a reactor core with a coolant circulated there through and wherein said index is Departure From Nucleate Boiling Ratio and wherein said system parameters include reactor core power, reactor core power distribution, reactor coolant temperature, reactor coolant pressure and reactor coolant flow rate.

23. The improved method of claim 22 wherein said time period (T) depends on one of system reaction time and core power distribution.

24. The improved method of claim 21 wherein said step of correctively regulating said Nuclear Power System includes the steps of:

1. generating an index trip set point electrical signal commensurate with a limiting value of said index;
2. comparing said signal commensurate with the projected value of said index and said signal commensurate with said limiting value of said index; and
3. correctively regulating said Nuclear Power System when said signal commensurate with said projected value of said index reaches said signal commensurate with said limiting value of said index.

25. The improved method of claim 24 wherein said Nuclear Power System has a nuclear reactor with a reactor core with a coolant circulated there through and wherein said index is Departure From Nucleate Boiling Ratio and wherein said system parameters include reactor core power, reactor core power distribution, reactor coolant temperature, reactor coolant pressure and reactor coolant flow rate.

26. The improved method of claim 25 wherein said time period (T) depends on one of system reaction time and core power distribution.

27. The improved method of claim 21 wherein said time period (T) includes system reaction time.

28. The improved method of claim 21 wherein said Nuclear Power System includes a nuclear reactor with a core and said time period (T) depends upon one of system reaction time and core power distribution.

29. A method for preventing the violation of a nuclear steam supply system design limit said system having a nuclear reactor with a core and having fuel pins and channels therein through which a coolant is circulated, said method comprising the steps of:

a. generating a multiplicity of electrical parametric signals which are commensurate with a multiplicity of nuclear steam supply system parameters, said parameters including the parameters used in calculating the DNBR of said reactor core;

b. generating from said parametric signals of step (a) an electrical signal commensurate with a projection of DNBR over a predetermined time period (T), said projection generating step including the steps of determining from said parametric signals a time derivative and multiplying said time derivative by a positive value of said time period (T);

c. generating an electrical set point signal commensurate with the minimum allowable DNBR value;

d. comparing said signal commensurate with said projection of DNBR and said signal commensurate with the minimum allowable DNBR value; and e. correctively regulating said reactor when said signal commensurate with said projected DNBR equals or falls below said signal commensurate with the minimum allowable DNBR value.

30. An improved Nuclear Power System fuel damage projection apparatus for the prevention of the violation of a fuel design limit, said apparatus being of the type which utilizes an index which is representative of the proximity of the violation of said design limit, said index being mathematically represented by an equation which defines the functional relationship between said index and a multiplicity of system parameters, said apparatus including means for continuously generating a multiplicity of electrical signals which each vary as a function of one of said multiplicity of system parameters and means responsive to said multiplicity of said electrical signals for generating an electrical signal commensurate with said index, the improvement comprising:

a. means responsive to one of said continuously generated electrical parametric signals for generating an electrical signal commensurate with a projection of said index due to the projected change of said one electrical parametric signal over a projected time period (T), said means for generating an electrical signal commensurate with a projection of said index including means responsive to the rate of change of said one parametric signal for generating a signal commensurate with a projected change of index due to the projected change of said one parametric signal over a projected time period (T); and b. means for summing said signal commensurate with a projected change of index and said electrical signal commensurate with said index for generating an electrical signal commensurate with a projected index due to the change of said one parametric signal over a projected timer period (T).

c. means responsive to said electrical signal commensurate with a projection of said index for correctively regulating said Nuclear Power System.

31. The improved fuel damage protection apparatus as recited in claim 30 wherein said means for generating an electrical signal commensurate with a projected change of index due to the projected change of said one parametric signal over a projected time period (T) comprises:

a. means responsive to said one parametric signal for continuously generating an electrical signal commensurate with the derivative of said one parametric signal with respect to time;

b. means responsive to said signal commensurate with the derivative of said one parametric signal with respect to time for generating an electrical signal commensurate with the product of said derivative signal and a value commensurate with the partial derivative of said index with respect to said reactor parameter represented by said one parametric signal, said generated signal is a signal commensurate with the derivative of said index with respect to time;

c. means responsive to said signal of element (b) (the derivative of index with respect to time) for generating an electrical signal commensurate with the product of said signal of element (b) and a value commensurate with a time period (T), said product signal is a signal commensurate with a projected change of index over a projected time period (T) due to a projected change in said one parametric signal.

32. The improved fuel damage protection apparatus as recited in claim 31 wherein said system includes a nuclear reactor with a core which is cooled by a coolant circulating there through and which is controlled by the insertion of control rods, and said one parametric signal is a signal commensurate with said reactor's parameter of coolant system flow rate, and said apparatus further comprising means responsive to said reactor's axial power distribution for generating an electrical signal commensurate with a time period (T) as a function of axial power distribution.

33. The improved fuel damage protection apparatus as recited in claim 32 wherein said time period (T) further includes a portion equivalent to the reaction time of said fuel damage protection apparatus.

34. The improved fuel damage protection apparatus as recited in claim 31 wherein said time period (T) includes at least a portion determined by the reaction time of said fuel damage protection apparatus.

35. The improved fuel damage protection apparatus as recited in claim 30 wherein said time period (T) includes the reaction time of said fuel protection apparatus.

36. An improved Nuclear Power System fuel damage protection apparatus for the prevention of the violation of a fuel design limit, said apparatus being of the type which utilizes an index which is representative of the proximity of the violation of said design limit, said index being mathematically represented by an equation which defines the functional relationship between said index and a multiplicity of system parameters, said apparatus including means for continuously generating a multiplicity of electrical signals which each vary as the function of one of said multiplicity of system parameters and means responsive to said multiplicity of electrical signals for generating an electrical signal commensurate with said index, wherein said index is Departure From Nucleate Boiling Ratio (DNBR) and wherein said apparatus includes means responsive to one of said continuously generated electrical parametric signals for generating an electrical signal commensurate with a projection of said index due to the project change of said one electrical parametric signal over a projected time period (T), and wherein the improvement comprises:

1. means responsive to one of said parametric signals commensurate with a Nuclear Power System parameter for generating an electrical signal commensurate with a change in DNBR due to the change of said one parameter with respect to the long term average value of said parameter, said average value constrained to be equal to or less limiting on DNBR than the continously generated value of said parameter;

2. means for generating an electrical signal commensurate with a preselected value of DNBR which is higher by a predetermined margin than the minimum allowable value of DNBR for which a critical heat flux is exceeded;

3. means responsive to said signals of elements (1) and (2) for summing said signals to generate a signal commensurate with an updated DNBR margin;

4. means responsive to said updated DNBR margin signal of element (3) and to said electrical signal commensurate with said index (DNBR index) for selecting the larger of the two signals;

5. means responsive to said one parametric signal for generating an electrical signal commensurate with a projected change of said parameteric signal over a projected time period (T), said projected change being limited to negative values;

6. means responsive to said larger signal of element (4) and to said signal commensurate with a projected change of DNBR due to the projected change of said parametric signal over a projected time period (T) of element (5) for summing said signals of elements (5) and (4) to produce a signal commensurate with the projected value of the DNBR; and 7. means responsive to said electrical signal commensurate with the projected value of DNBR for correctively regulating said Nuclear Power System when the projected value of the DNBR violates a design limit.

37. The improved fuel damage protection apparatus recited in claim 36 further comprising:

1. means for generating a trip set point electrical signal commensurate with the minimum allowable DNBR value; and 2. means responsive to said summed signal of element (6) of claim 36 and to said trip set point signal of element (1) of claim 37 for comparing said signals.

38. The improved fuel damage protection apparatus as recited in claim 36 wherein means for generating an electrical signal commensurate with a change in DNBR due to the change of said parameter with respect to the long term average value of said parameter includes:

1. means responsive to said one parametric signal for continuously generating an electrical signal commensurate with the average value of said one parametric signal over a preselected finite period of time, said average value constrained to be equal to or less limiting on DNBR than the continuously generated value of said parameter;

2. means for continuously subtracting said signal commensurate with the average value of said one parametric signal of element (1) of claim 38 from the continuously generated value of said one parametric signal to generate an electrical signal commensurate with the most recent deviation of said parameter from its average value taken over a finite period of time;

3. means for multiplying said signal commensurate with the most recent deviation of said one parameter from its average value of element (2) of claim 38 by a signal commensurate with the partial derivative of DNBR with respect to the parameter of said one parametric signal to generate a signal commensurate with the change in DNBR due to the change of said one parameter.

39. The improved fuel damage protection apparatus as recited in claim 38 wherein said time period (T) includes the reaction time of said fuel damage protection apparatus.

40. The improved fuel damage protection apparatus as recited in claim 36 wherein said time period (T) includes the reaction time of said fuel damage protection apparatus.

41. A method for the protection against violation, in real time, of a nuclear reactor power system design limit, the proximity to which is indicated by an index, the method comprising:
 a. anticipating and compensating for the inability of the reactor's protection system to respond instantaneously to a rapidly occurring operational transient, said inability due, at least in part, to the time delays or reaction time inherent in the physical apparatus of the reactor's protection system, said anticipating and compensating step including the step of generating an electrical signal indicative of a projection of the index over a positive time period (T) into the future in response to the dynamic behavior of the index itself or one of its component parts; and
 b. correctively regulating said nuclear power system in response to said signal indicative of said projection when said index projection violates said design limit.

42. The method as recited in claim 41 wherein said step of generating a signal indicative of a projection of the index includes the steps of:
 a. from the dynamic behavior of said index or a component part thereof, generating an electrical signal indicative of the time derivative of said index; and
 b. multiplying said time derivative by a positive time period (T) to generate an electrical signal indicative of a projection of said index into the future over said time period (T).

43. The method as recited in claim 42 further including the step of determining protection system reaction time, to be used as said time period (T) over which said projection is made, a portion of said reaction time being directly attributable to the physical equipment comprising the protection system, said step including measuring said physical delays.

44. The method as recited in claim 43 wherein said step of determining protection system reaction time includes the steps of:
 a. monitoring reactor flux to obtain a representation of axial power distribution; and
 b. from said representation of axial power distribution determining a portion of said reaction time attributable to said axial power distribution.

* * * * *

UNITED STATES PATENT AND TRADEMARK OFFICE
CERTIFICATE OF CORRECTION

PATENT NO. : 4,318,778
DATED : March 9, 1982
INVENTOR(S) : Charles R. Musick

It is certified that error appears in the above—identified patent and that said Letters Patent is hereby corrected as shown below:

Column 3, line 35, delete "-" and insert --=-- after "DNBR";

Column 15, line 54, cancel "mode" and insert --model--;

Column 16, line 30, cancel "mixing" and insert --making--;

Column 16, line 44, cancel "$T_o$" and insert --$T_c$--;

Column 18, line 50, cancel "statis"" and insert --static--;

Column 18, line 64, cancel "$\dot{m}_1$" and insert --$\dot{m}_i$--;

Column 19, line 66, cancel "typical" and insert --physical--;

Column 20, line 15, cancel "priod" and insert --period--;

Column 20, line 23, cancel "$m_5$" and insert --$m_t$--;

Column 21, line 28, cancel "$T_o$" and insert --$T_c$--;

Column 21, line 67, cancel "resisting" and insert --decreasing--;

Column 23, line 11, cancel "m" and insert --$\dot{m}$--;

Column 23, line 15, cancel "[ +$\Delta$m/$\dot{m}$]" and insert-[1+$\Delta$m/$\dot{m}$]--;

Column 23, line 38, cancel "-power" and insert --=power--;

Column 23, line 49, cancel "Q" and insert --$\phi$--;
Column 23, line 41, cancel "$T_o$" and insert --$T_c$--;
Column 24, line 21, cancel after "system" insert --must--;

UNITED STATES PATENT AND TRADEMARK OFFICE
CERTIFICATE OF CORRECTION

PATENT NO. : 4,318,778
DATED : March 9, 1982
INVENTOR(S) : Charles R. Musick

It is certified that error appears in the above—identified patent and that said Letters Patent is hereby corrected as shown below:

Column 25, line 36, change "out-or-core" to --out-of-core--;

Column 25, line 58, after the and before periph-, insert --core--;

Column 26, line 18, change "OLet" to --Let--;

Column 26, line 23, change "$o_1$" to --$\hat{\phi}_i$--;

Column 26, line 28, change "$\hat{o}$" to --$\hat{\phi}$--;

Column 26, line 43, change "$\hat{\phi}$" to --$\phi$--;

Column 26, line 68, change "F." to --$\underline{F}$--;

Column 36, line 54, change "The" to --This--;

Column 36, line 55, change "is" to --it--;

Column 37, line 47, change "$V_i = F_i 8RPM, \Delta P(RPM,N)$" to --$V_i = F_i (RPM, \Delta P(RPM, N)$--.

Column 37, line 68, add --(-- before "$C_o$";

Column 40, line 57, change "$\Delta \psi_i$" to --$\Delta \psi_i$--;

Column 42, line 37, change "$F_{ri}$" to --$F_{r_i}$--;

Column 42, line 37, change "$F_{zi}$" to --$F_{z_i}$--;

Column 45, line 20, after "point" insert --signal--;

Column 46, line 61, change ";" to --:--;

UNITED STATES PATENT AND TRADEMARK OFFICE
CERTIFICATE OF CORRECTION

PATENT NO. : 4,318,778

DATED : March 9, 1982

INVENTOR(S) : Charles R. Musick

It is certified that error appears in the above—identified patent and that said Letters Patent is hereby corrected as shown below:

Column 47, line 52, change "g." to --h.--;

Column 47, line 56, change "h." to --i.--;

Column 47, line 59, change "i." to --j.--;

Column 47, line 63, change "j." to --k.--;

Column 48, line 48, change "14" to --15--;and

Column 50, line 18, change "projection" to --protection--.

Signed and Sealed this

Fifteenth Day of July 1986

[SEAL]

Attest:

DONALD J. QUIGG

Attesting Officer

Commissioner of Patents and Trademarks